United States Patent

Ehlers et al.

[11] Patent Number: 5,717,904
[45] Date of Patent: Feb. 10, 1998

[54] APPARATUS AND METHODS FOR AUTOMATICALLY CONTROLLING BLOCK WRITES

[75] Inventors: Steven B. Ehlers, Cedar Park; Michael D. Asal, Austin, both of Tex.

[73] Assignee: Brooktree Corporation, San Diego, Calif.

[21] Appl. No.: 543,236

[22] Filed: Oct. 13, 1995

Related U.S. Application Data

[60] Provisional application No. 60/004,756 Oct. 2, 1995.
[51] Int. Cl.⁶ .................................................. G06F 13/00
[52] U.S. Cl. ........................... 395/511; 395/509; 395/513; 395/521; 395/525
[58] Field of Search ..................... 395/501–503, 395/509, 511, 513, 521, 525, 526, 432; 345/186, 189; 365/230.03, 230.05, 230.06, 230.08

[56] References Cited

U.S. PATENT DOCUMENTS

| | | | |
|---|---|---|---|
| 4,606,068 | 8/1986 | Habitzreiter et al. | 382/56 |
| 4,747,042 | 5/1988 | Ishii et al. | 364/200 |
| 4,807,189 | 2/1989 | Pinkham et al. | 365/189 |
| 4,870,491 | 9/1989 | Ishii | 358/160 |
| 5,233,690 | 8/1993 | Sherlock et al. | 395/165 |
| 5,269,001 | 12/1993 | Guttag | 395/165 |
| 5,282,177 | 1/1994 | McLaury | 365/230.05 |
| 5,287,470 | 2/1994 | Simpson | 395/425 |
| 5,305,278 | 4/1994 | Inoue | 365/230.03 |
| 5,319,606 | 6/1994 | Bowen et al. | 365/230.06 |
| 5,392,241 | 2/1995 | Butler et al. | 365/189.01 |

*Primary Examiner*—Mark R. Powell
*Assistant Examiner*—U. Chauhan
*Attorney, Agent, or Firm*—William C. Cray; Susie H. Oh

[57] ABSTRACT

A system for processing a stream of data and automatically selecting a portion or all of the data stream for block writing to a memory. The memory is capable of storing data in response to a block write command and a normal write command. The system contains a first data register and a second data register having the same data width. The first data register accepts data from the data stream in accordance with the its data width. Data stored in the first data register is transferred to the second data register. The first data register is then loaded with a portion of the data stream which is contiguous to the data stored in the first data register prior to the transferring. The data in the first and the second data registers is then compared. If the data in the first and the second registers is the same, then the content of a data counter is increased by one. When the content of the data counter exceeds a predetermined value, the system executes a block write command.

28 Claims, 12 Drawing Sheets

APPARATUS AND METHODS FOR AUTOMATICALLY CONTROLLING BLOCK WRITES

REFERENCE TO RELATED APPLICATION

The present application claims priority from a provisional application Ser. No. 60/004756 filed Oct. 2, 1995, and entitled "Apparatus And Methods For Automatically Controlling Block Writes" (attorney docket no. 11543-705).

FIELD OF THE INVENTION

This invention relates generally to controllers for random access memory devices, and more particularly, to circuits and methods for automatically controlling block-write operations of such memory devices.

BACKGROUND OF THE INVENTION

Dual-port RAMs, commonly referred to as video RAMs or VRAMs, offer dramatic speed improvements over standard dynamic RAMs (DRAMs). VRAMs are particularly effective in video display systems and in other applications where high-speed data buffering is required.

A VRAM has an array of dynamic memory cells. The array is accessed through either conventional DRAM control signals or through a serial access memory (SAM). A SAM is essentially a long shift register that receives a block of data from the dynamic memory array and shifts the data out of the VRAM serially through a serial port.

VRAMs are particularly useful as frame buffers for video systems. In such video systems, a graphics processor or microprocessor supplies randomly-addressed display frame data to a VRAM memory array as it would to a conventional DRAM. The VRAM then supplies the sequentially-addressed display frame data in a serial stream to image processing devices such as color lookup tables and digital-to-analog converters. The serial transfer does not interfere with the processor's random access of the VRAM memory array.

Various features have been incorporated in VRAMs to speed data transfer to and from an associated graphics processor or microprocessor. A "block write" function is an example of a feature provided in VRAMs to enhance the speed of writing data into the dynamic memory cells. The block write function is useful in video applications to quickly clear a large area of frame buffer memory or to create a background for a display window. The block write function allows the same data to be written into a block of memory using a single command rather than requiring a separate command for each location. Such a block may comprise an arbitrary or predefined number of memory cells or a logical unit of memory cells, such as an entire row of memory cells.

FIG. 1 is a schematic diagram of a prior an image processing system employing a VRAM. The system includes a CPU 102 connected to a VRAM 110 (used as a frame buffer) and a controller 103 (which controls the operation of VRAM 110). The output of VRAM 110 is connected to a display unit 104 through a digital-to-analog converter 106 (such as a RAMDAC). VRAM 110 includes a dynamic memory cell array 112 that is randomly accessible and a SAM 114 that is only serially accessible. VRAM 110 also contains specialized block write logic 116 for implementing block write functions. Generally, the portion of VRAM 110 that includes dynamic memory cell array 112 and block write logic 116 is referred to as the RAM port, and the portion of VRAM 110 including SAM is referred to as the SAM port.

Operating timings of VRAM 110 are controlled by controller 103. In addition, controller 103 controls the operation of VRAM 110 in accordance with commands received from CPU. The command set of controller 103 may include single-pixel commands (e.g., transfer individual pixels from one location to another), line commands (e.g., draw a line on display unit 104) and pixel-array commands (e.g., transfer a block of pixels from one area in memory to another). Commands for controlling the block write features of VRAM 110 are typically included within the set of pixel-array commands.

As explained in more detail below, block write logic 116 needs to be set up before data is actually written into dynamic memory cell array 112. Once the logic is set up, the time required for writing to consecutive memory cells in array 112 using a block write is less than the time that would be required to write the data to the same memory cells using a normal write command. The setup steps take a few clock cycles, which must be considered when determining the time required for performing a block write operation. If the size of the block is small, it may be more efficient to use normal write commands. Thus, even though block write commands are very efficient for writing a large block of data to memory cell array 112, they should not be used for small block.

Typically, block write commands are sent to controller 103 by an application program executing on CPU 102. If a programmer wishes to increase the speed of image processing, block write commands may be inserted into the application programs at appropriate places. The problem of relying on programmers to initiate block write commands is that many programmers do not include these commands in their programs. One of the reasons is that programmers simply do not have time to optimize their programs because there is a constant pressure to reduce the time to market. Another reason is that programmers may not want to spend the time to understand the timing specification of VRAMs and their corresponding controllers. Thus, they are not sure when is the best time to use block write commands. Consequently, these programmers may decide not to use any block write commands in their programs.

In addition, many graphics commands involve reading data from the VRAM, processing the data in controller 103, and writing the processed data back in the VRAM all without providing the data to the application program. For instance, a command to move a block of data from one location in the VRAM to another location may be carded out by controller 103 without providing the application program with the actual data over the system bus. Other similar commands include masking a block of data or logically XORing two blocks of data. Such commands are important since they execute quickly without unnecessary bus traffic. However, since the application program does not read the actual data, it cannot determine whether a block write should be used to write the processed data back into the VRAM. There is no way for the application program to determine whether the resulting data contains large blocks of repetitive data that could be efficiently written into the RAM using a block write command.

The reduction in bus traffic using block write commands at appropriate times is especially advantageous in multimedia environments. This is because bus bandwidth is one of the major bottlenecks in improving the performance of multimedia systems. Because block write commands are not properly used in prior art multimedia systems, their performance is not optimized.

Thus, it is desirable to have circuits which can automatically initiate block write operations without any input from application programs. Preferably such circuits would automatically use a block write command whenever it would be efficient without requiring data to be sent to an application program over the system bus. Such circuits would also preferably be inexpensively incorporated into controller or VRAM integrated circuits to provide optimized processing without significant additional cost.

SUMMARY OF THE INVENTION

The present invention relates to a method and a system for processing a stream of data and automatically selecting a portion or all of the stream of data for block writing to a memory. The memory is capable of storing data in response to a block write command and a normal write command. The system contains a first and a second data registers having the same data width. The first data register accepts data from the stream in accordance with its data width. Data stored in the first register is transferred to the second data register. The first data register is then loaded with a portion of the stream of data which is contiguous to the data stored in the first data register prior to the transferring. The data stored in the first and second data registers are then compared. The system also contains a data counter. The content of the data counter is increased by one when the data stored in the first and second data registers are the same. When the content of the data counter exceeds a predetermined value, the system executes a block write command.

The present invention is based on the realization that block write commands should be used only when the number of repetitive bytes in a block exceeds a certain value. This is because the execution of a block write command may require the writing of a color register prior to actual block writing. Unless the saving in time using block writing is more than the overhead of writing to the color register, a normal write command is a better choice. The present invention can automatically make appropriate decisions between block write and normal write.

In one embodiment of the present invention, the automatic block write system is incorporated in a media stream controller used in multimedia systems. The media stream controller exchanges information with a computer bus, a video input controller, an audio I/O controller, and a display memory. The display memory is configured to store audio, video and graphic data. The media stream controller is connected to the display memory through a shared random bus. The automatic block write system in the media stream controller reduces traffic on the shared random bus by optimizing the writing of data to the display memory.

These and other aspects of the invention may be obtained by referring to the following description taken in conjunction with the dawings.

DETAILED DESCRIPTION OF THE PREFERRED EMBODIMENT

Figure 1:
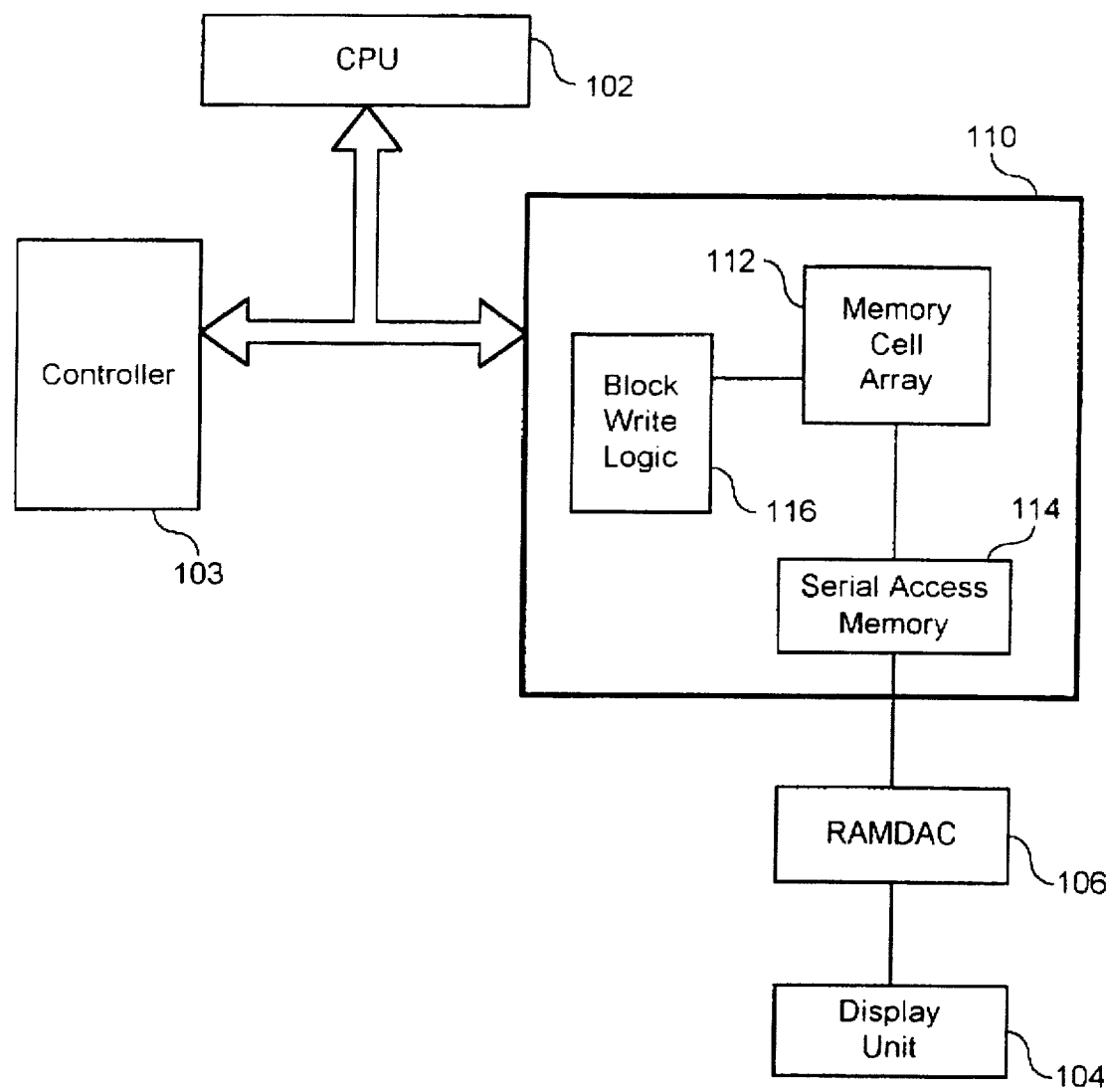
FIG. 1 is a schematic diagram of a prior art image processing system employing a VRAM.

Aspects of the present invention provide a system and method for automatically initiating block write commands for a memory device, such as a VRAM or the like. The following description is presented to enable any person skilled in the art to make and use the invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

As a preliminary matter, this invention concerns circuits that use voltages to represent binary logic values. Particular circuits may use varying voltage levels to represent the two binary logic values. Accordingly, the words "high" and "low" in this specification refer generally to voltages corresponding to the true and false binary logic values, respectively, within a given sub-circuit. Signals are generally considered "active" when they are high. However, a "*" following the signal name indicates that the signal has negative or inverse logic (that is, the signal is considered active when low). These conventions will be used in the following written disclosure. In the drawings, negative logic signals are indicated with a bar over the signal name.

Figure 2:
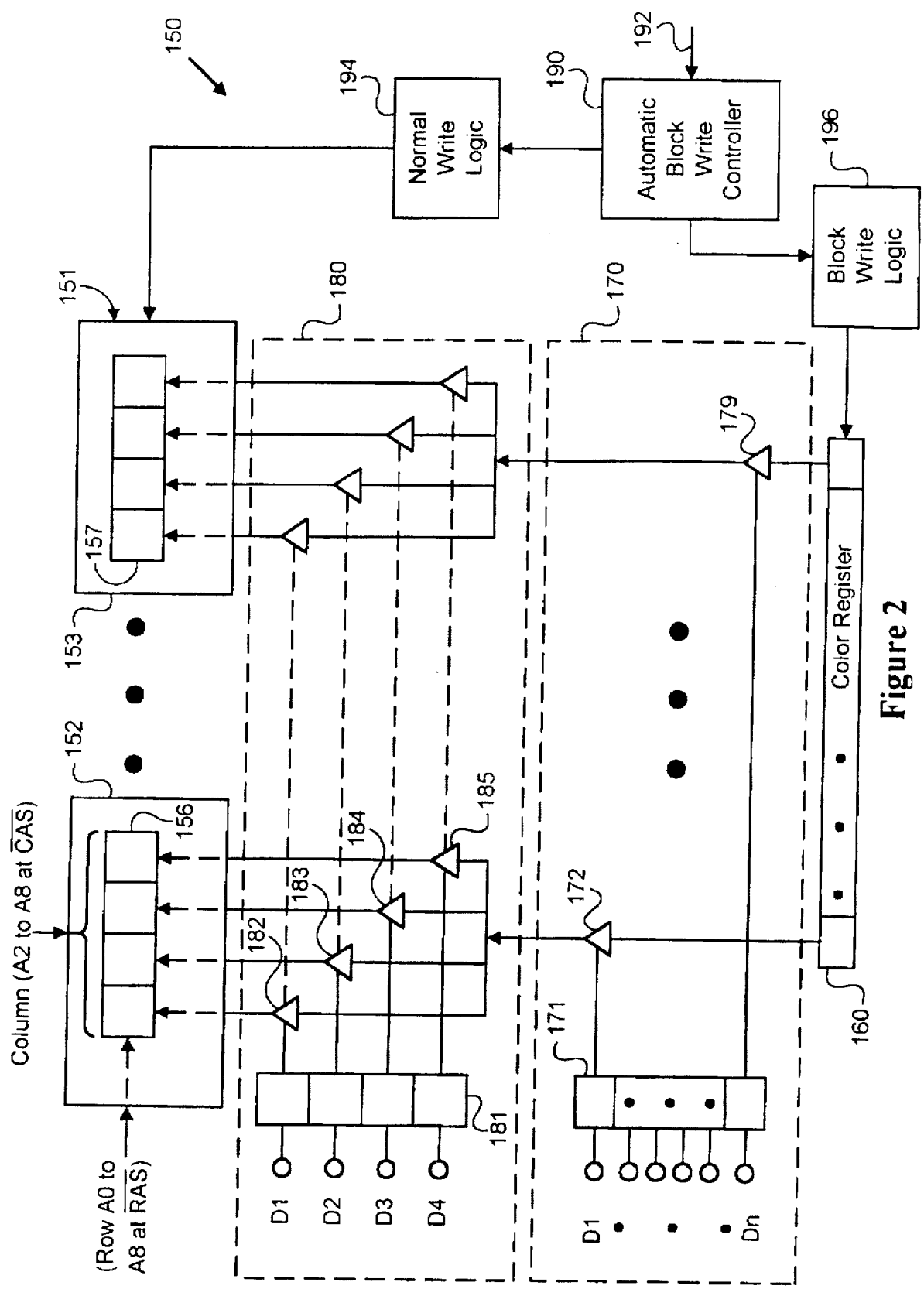
FIG. 2 is a conceptual diagram of a system containing an automatic block write controller of the present invention and a RAM port portion of a VRAM.

FIG. 2 is a conceptual diagram of a system 150 containing an automatic block write controller of the present invention and a RAM port portion of a conventional VRAM. In one embodiment of the present invention, the automatic block write controller can be fabricated on a chip (or chips) separate from the VRAM. In an exemplary embodiment, the automatic block write controller is fabricated as part of a multimedia controller that uses a display memory with block write capability to buffer video, graphics, and audio data. The automatic block write feature is particularly advantageous in such a multimedia system, because it reduces traffic on the bus to the display memory which must be shared by high bandwidth video, graphics and audio.

System 150 contains a DRAM array 151, arranged logically as a number of two-dimensional planes of memory cells (only the first plane 152 and the last plane 153 are shown). Each plane has addressable rows and columns of memory cells. Individual memory cells are not shown, with the exception of two arbitrarily selected block of four consecutively-addressed memory cells 156 and 157 in planes 152 and 153, respectively. Blocks 156 and 157 are shown as an example of consecutive locations loaded during a block write cycle. A data register (e.g., a byte of data) is made up of memory cells from the planes having the same row and column addresses. For example, a data register having a width of eight bits (i.e., a byte) is made of memory cells from eight planes each having the same row and column addresses.

In an exemplary embodiment, the number of planes is eight and the number of consecutive cells for a block write is four. It should be appreciated that aspects of the present invention may be applied to memories having a block write command using any number of planes and any number of consecutively addressed memory cells. For example, some VRAMs have block write commands that load eight consecutive memory cells. In addition, it is also possible to cascade several integrated circuits. For example, four identical integrated circuits each having eight planes can be arranged in parallel such that the same row and column addresses is associated with thirty two bits of data.

System 150 also contains a color register 160 for storing the data to be written to DRAM array 151 during a block write cycle. In the exemplary embodiment color register 160 is a static memory register organized into four or eight bits, or multiple thereof. In a block write operation, color register 160 is first initialized during a color register load cycle. Subsequently, data from color register 160 is written to blocks of memory registers within DRAM array 151, such as blocks 156 and 157, during block write cycles. In an exemplary embodiment, the width of color register 160 is eight.

During a block write cycle, a row address and a column address are provided to system 150 through a multiplexer address bus. System 150 latches the row address from A0 through A8 at the falling edge of RAS* (row address strobe active low), and the column address from A2 through A8 at the falling edge of CAS* (column address strobe active low). A0 and A1 of the column address are disregarded during the block write cycle because four consecutive cells are loaded at the same time. The row address and column block address form a memory cell base address which is the address of the first memory cell of a block of four adjacent memory cells within a row. Data is written simultaneously from color register 160 to the memory cells in blocks 156 or 157 through a bit masking circuit 170 and column masking circuit 180.

Bit masking circuit 170 allows individual bits to be masked from writing so that a memory write may be performed on specified bits without altering the remaining bits. Bit masking circuit 170 contains a bit mask register 171 having the same number of bits as that of color register 160. Each bit of bit mask register 171 is associated with a bit enable gate. In FIG. 2, only the first gate 172 and the last gate 179 are shown. Bit mask register 171 is loaded with a bit mask code from data signals (D1 through Dn) during a bit mask register load cycle. Each bit of bit mask register 171 corresponds to a bit of color register 160. A bit value of zero indicates that the corresponding color register bit is to be masked. A bit value of one indicates that the corresponding write register bit is to be written to DRAM array 151.

Column masking circuit 180 allows specification of a column mask code. It contains a column mask register 181 and four corresponding bit enable gates 182–185. The column mask code is latched in column mask register 181 from data signals D1 through D4 at the latter of WE* (write enable active low) and CAS* going low during the block write cycle. Each bit of column mask register 180 corresponds to one of the four adjacent column locations. A bit value of zero indicates that the corresponding column is to be masked. A bit value of one indicates that the corresponding column is to be written from color register 160.

System 150 also contains an automatic block write controller 190 which accepts a stream of input data and an address from a bus 192 and determines whether a block write should be invoked based on the repetition pattern in the data. A detailed description of the structure of controller 190 will be provided below in connection with FIG. 6. If it is determined that a block write should not be invoked, the input is sent to a normal write logic block 194 which writes the input data to DRAM array 151 at an address determined by the address received from bus 192. If it is determined that a block write should be invoked, the input data is sent to a block write logic block 196. Block write logic block 196 loads color register 160 with the data received from bus 192 and initiate a block write to DRAM array 151 at an address received from bus 192.

Figure 3:
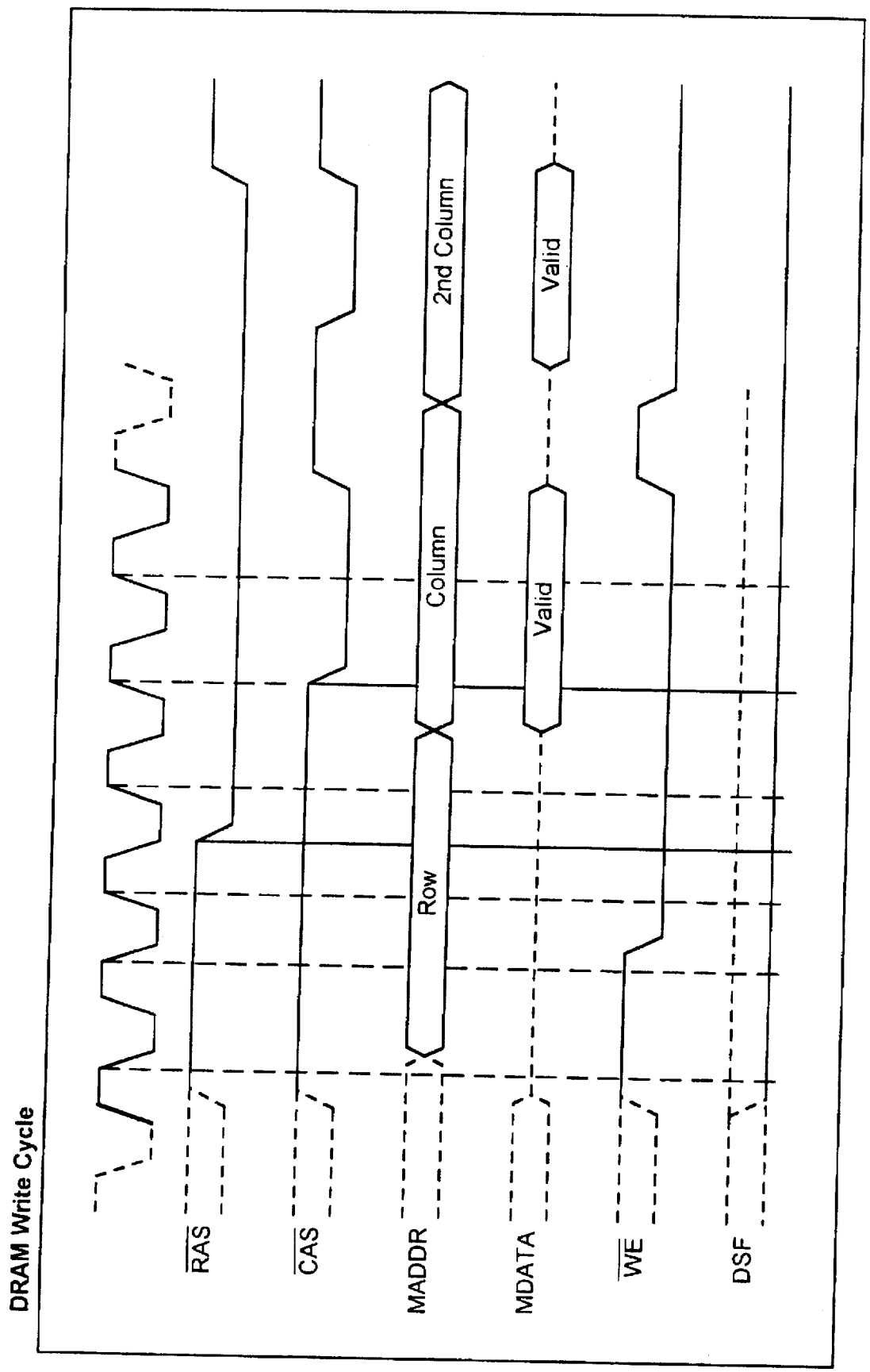
FIG. 3 illustrates the required sequence and relative timing of control signals to perform a normal write cycle in accordance with the present invention.

The timing diagrams of some of the modes of operation of system 150 will now be described. FIG. 3 illustrates the required sequence and relative timing of control signals to perform a normal write cycle to a single memory register within DRAM array 151. A write enable signal, WE*, goes low to indicate a writing instead of a reading. RAS* goes low to signal the presence of a valid row address signal at MADDR (memory address line). CAS* then goes low to signal a valid column address at MADDR and valid data at MDATA (memory data line). Data on MDATA is written to the addressed memory cell. A special Function signal, DSF, is used in the VRAM of FIG. 2 to control block writes. During a normal write cycle, DSF remains low throughout the entire write cycle.

FIG. 3 also shows a situation in which data is to be written into consecutive memory cells. Note that only one row address needs to be supplied. The column addresses together with the associated data are supplied sequentially following the row address.

Figure 4:
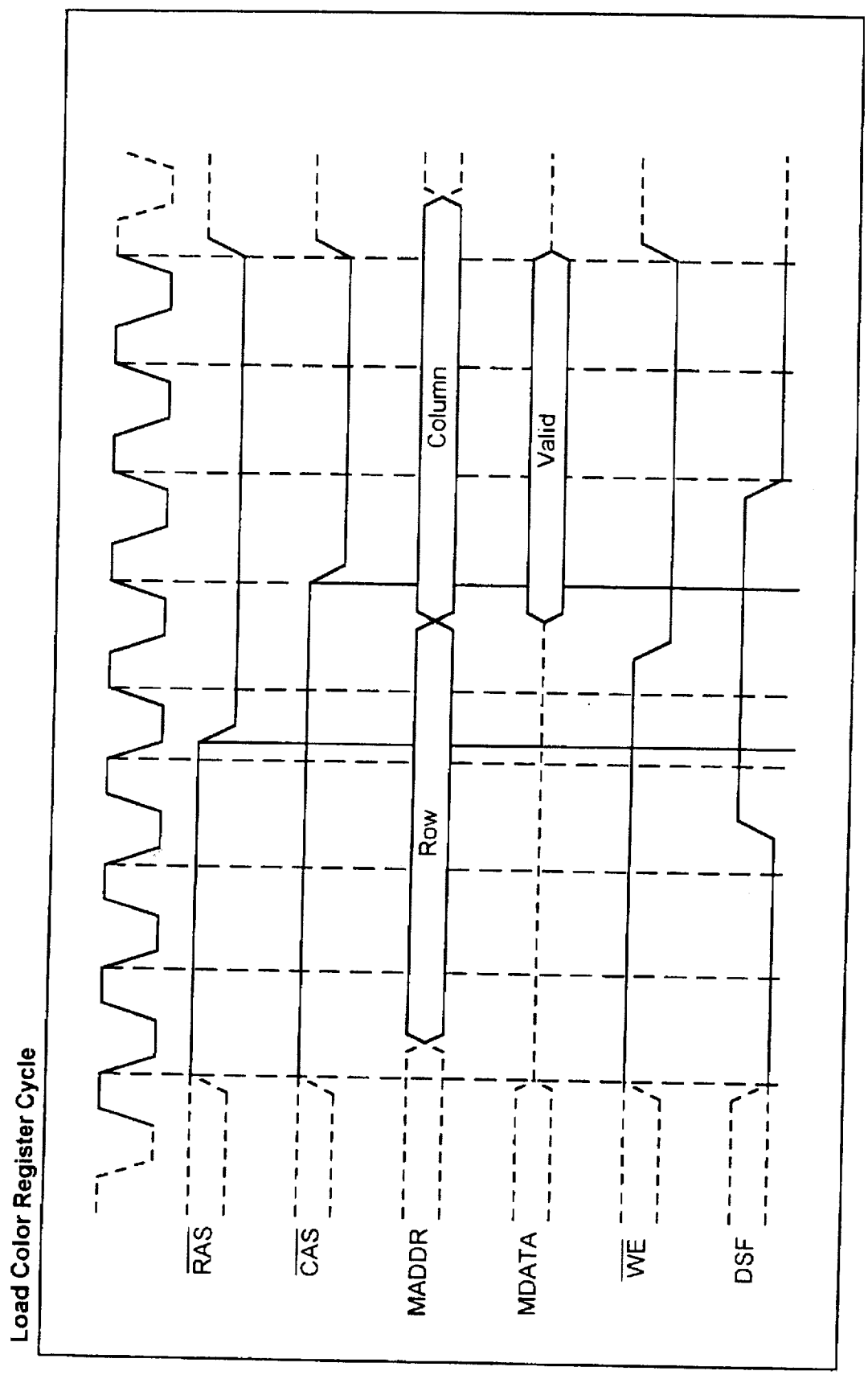
FIG. 4 illustrates the required sequence and relative timing of control signals to perform a color register load cycle in accordance with the present invention.

FIG. 4 illustrates the required sequence and relative timing of control signals to perform a color register load cycle. The color register load cycle is similar to a normal write cycle, with address signals being in "don't care" states since there is no need to specify a memory address. DSF and WE* are both high as RAS* goes low to signal initiation of the color register load cycle. CAS* is lowered during the color register load cycle to indicate the presence of valid write register data at MDATA. DSF must remain high throughout the color register load cycle.

Figure 5:
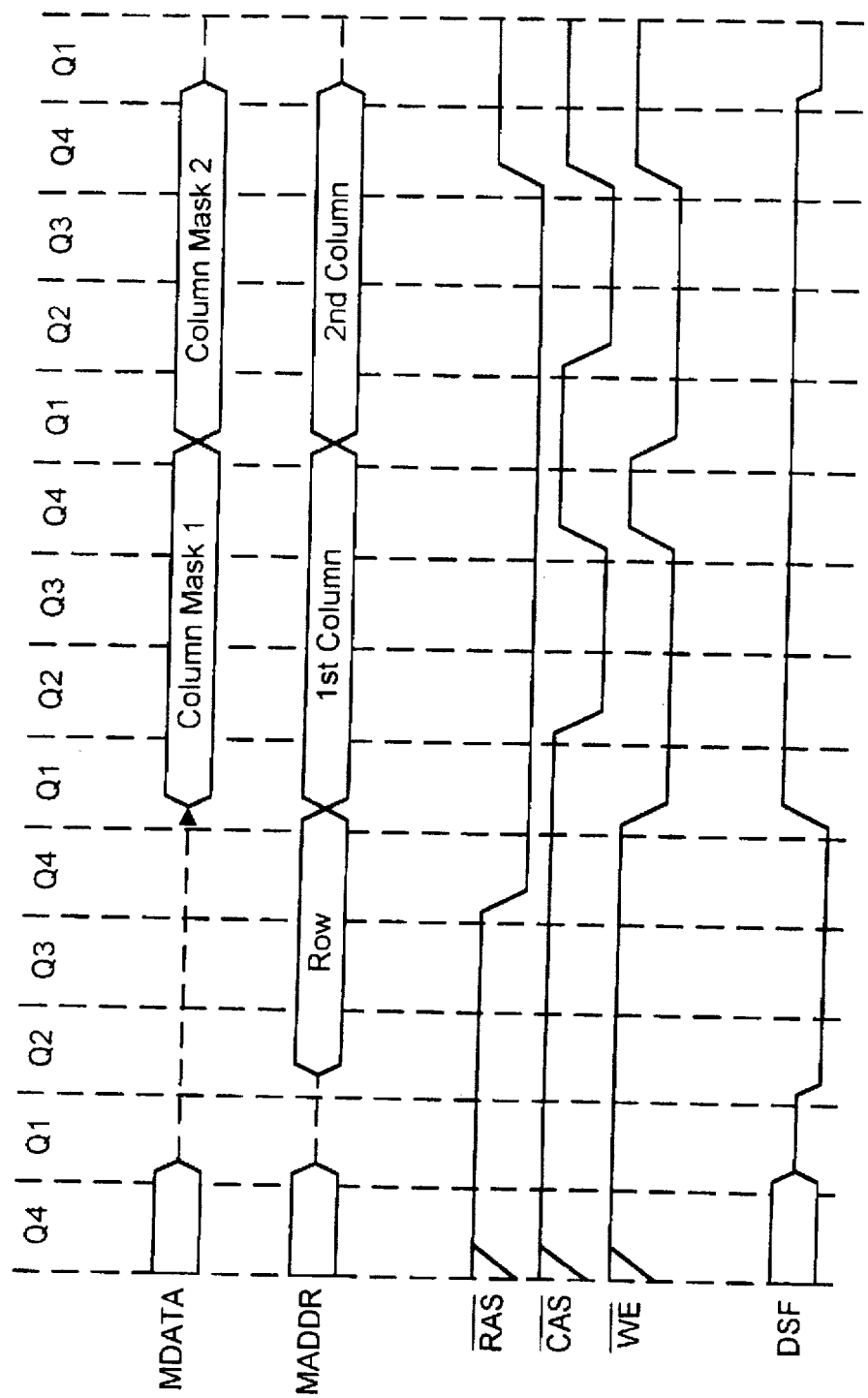
FIG. 5 illustrates the required sequence and relative timing of control signals to perform a non-masked block write cycle in accordance with the present invention.

FIG. 5 illustrates the required sequence and relative timing of control signals to perform a non-masked block write cycle, wherein a block of consecutively-addressed memory cells within a row of DRAM array 151 are simultaneously written with data from color register 160. As RAS* goes low, WE* is high and DSF is low to signal initiation of a block write cycle. DSF additionally must be high as CAS* goes low. RAS* going low also signals the presence of a valid row address at MADDR. WE* and CAS* are lowered to signal the presence of a valid column block address at MADDR. The content of color register 160 is written to the addressed block of memory cells at the latter of CAS* and WE* to go low. Address signals A0 and A1 (for the case of four consecutive columns) or A0 to A2 (for the case of eight consecutive columns) are ignored in forming the column block address during a block write cycle.

FIG. 5 also shows a situation in which data are to be written into consecutive blocks of addresses. Note that only one row address needs to be supplied. The column addresses together with the associated column mask data are supplied sequentially after the row address.

It can be seen from the above description of the operation of block write that it may be necessary to set up color register 160 prior to a block write. The time for setting up the color register needs to be added to the time for writing data to DRAM array 151 in order to obtain an accurate measure of the total time for the block write. This time is then compared to the time for writing consecutive cells using normal write operations to determine when a block write is efficient. The following is comparison using timing values for an exemplary VRAM.

Typical time for completing a row address bus signaling: 5 cycles.

Typical time for completing a column address bus signaling: 2 cycles.

Since data is latched into the DRAM array during column address signaling, no additional time is required for the latching of data.

The timing for a normal write command is discussed first. The total number of cycles to write four consecutive memory cells is (5+4*2)=13 cycles. The total number of cycles to write eight consecutive memory cells is (5*1+8*2)=21 cycles. This calculation assumes that no page fault occurs (i.e., jumping across a page boundary during the writing).

When a block write is performed, the first step is to load color register 160 if the data to be written is different from the data already existing in the color register. As can be seen in FIG. 4, both row and column addresses need to be supplied. The total number of cycles for loading the color register is then (5+2)=7cycles. In this example, a conservative estimated is used, so it is assumed that a page boundary is crossed, thereby invoking a penalty of (typically) three cycles. Thus, the total number of cycles for loading the color register is 10. However, if the color register does not have to be loaded (e.g., because the new data is the same as the data already loaded into the color register), the setup time of 10 cycles is not required.

The address of the data in DRAM array 151 is then supplied. Only one block write operation (which requires one row and one column address) is needed to write to four consecutive memory cells. The number of cycles for one block write operation to the DRAM array is (5+2)=7 cycles. In this example, a conservative estimate is used, so it is assumed that a page fault occurs, which adds three more cycles to the operation. Consequently, the total number of cycles is 10. If it is necessary to write to eight consecutive cells, two block write operations are needed. The number of cycles is (5+2*2)=9. Again, it is assumed that a page fault occurs. The number of cycles for two consecutive block write operations to DRAM array 151 is 12 cycles.

If there is no need to load the color register (e.g., because the new data to be stored in DRAM array 151 is the same as the existing contents of the color register, a block write requires 10 cycles while a normal write to four consecutive memory cells takes 13 cycles. Thus a block write is more efficient when the bits of the four consecutive memory cells are the same.

If it is necessary to load the color register prior to a block write to DRAM array 151, a single block write would require (10+10)=20 cycles while a normal write to four consecutive memory cells requires 13 cycles. Thus, it is not usually efficient to use a block write. Turning now to the case in which eight consecutive memory cells contain the same bits, two block write operations require 22 cycles while a normal write to eight consecutive memory cells requires 21 cycles. However, six cycles are allocated for page fault to block write while none are allocated to normal write. Further, there is also a possibility that the next four consecutive memory cells will contain the same values. In which case a block write may be used without writing to the color register. The total time for writing to the 12 consecutive memory cells using block write is 32 cycles while 34 cycles are needed if normal write is used. Thus, on average it is considered better to perform a block write, because a page fault might not occur and the setup time might be saved in subsequent block writes. In view of these considerations, block write operation is preferred when it is necessary to write eight consecutive memory cells with the same bits.

It should be appreciated that the above computation is performed for an exemplary VRAM having the timing characteristics described above. If a VRAM has different timing characteristics or electrical structure (e.g., a block write involves eight consecutive memory cells), a different computation needs to be performed. However, it is understood that the principle discussed above may be applied to all types of memories having block write capabilities to determine when use of the block write feature is likely to be efficient.

Figure 6:
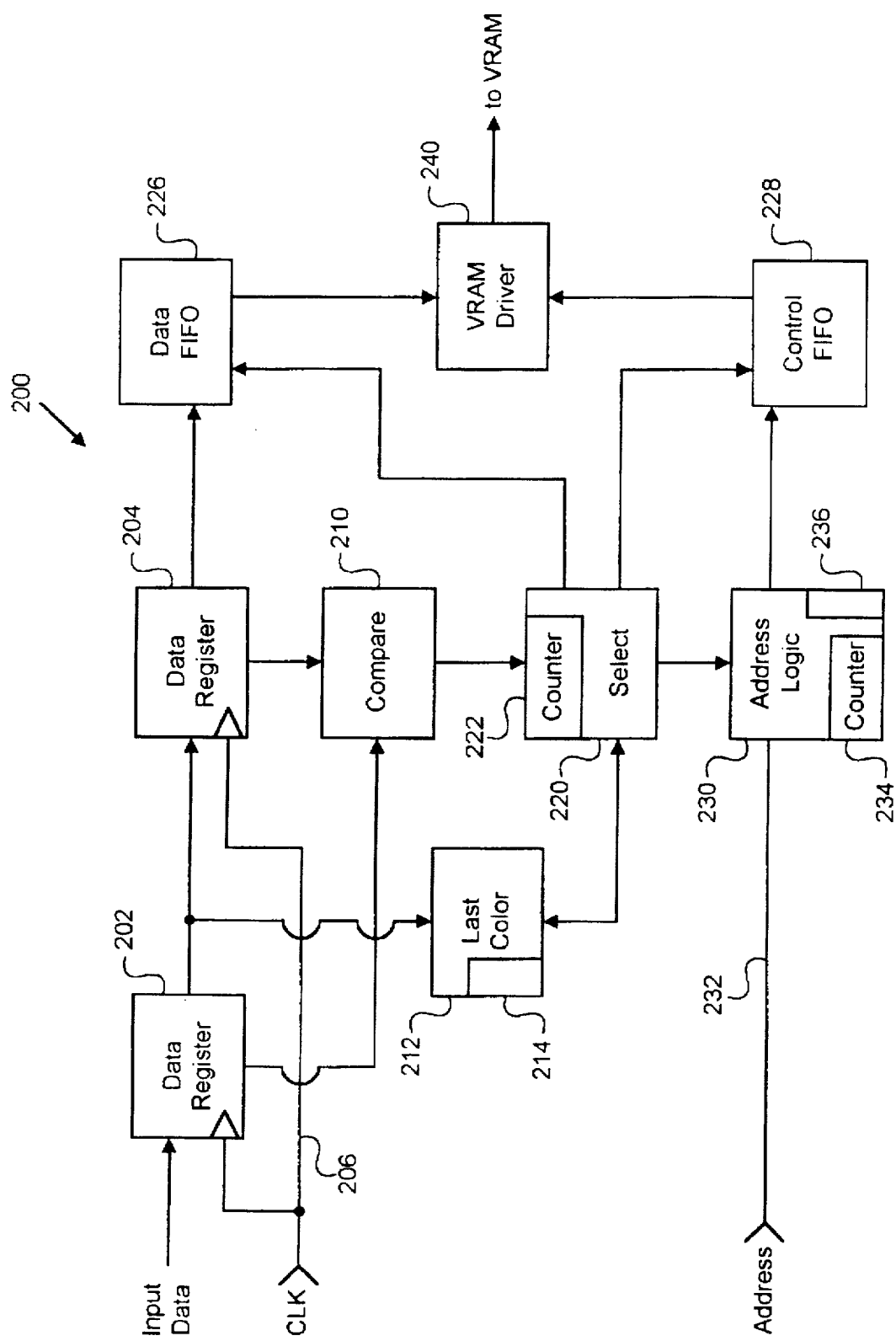
FIG. 6 is a block diagram showing the structure of an automatic block write controller in accordance with the present invention.

A block diagram showing the structure of an automatic block write controller 200 in accordance with the present invention is shown in FIG. 6. Controller 200 comprises two data registers 202 and 204 each driven by a clock signal (CLK) on a line 206. In one embodiment of the present invention, the length of data registers 202 and 204 is thirty two bits (a DWORD). However, other sizes could be used. Data register 202 accepts a stream of input data and shifts the same to data register 204 and a last color block 212. Data is loaded in registers 202 and 204 in units of 32 bits. Consequently, data register 204 contains a DWORD which is the same DWORD that was loaded in data register 202 prior to shifting. The data stored in data registers 202 and 204 are coupled to a compare logic block 210.

Compare logic block 210 comprises a circuit for comparing data in registers 202 and 204. When a DWORD in register 202 is the same as a DWORD in register 204, compare logic block 210 generates a signal to increase a counter 222 in a select logic block 220 by one. Counter 222 is cleared whenever the DWORD in register 202 is not the same as the DWORD in register 204. Thus, the value of counter 222 indicates the number of consecutive DWORDs that are the same in the input data stream.

Select logic block 220 of controller 220 is now described. This block selects the mode of writing to VRAM array 151 (i.e., a normal write or a block write) based on a predetermined criteria. It contains circuits to generate a "block write" signal (preferably one of the states of a two digit "type" signal) when a block write is likely to require fewer clock cycles than a normal write and to generate a "normal write" signal (preferably another state of the two digit "type" signal) when a block write is likely to take more clock cycles than a normal write. As explained above, the decision criteria depends on the value in counter 222 and whether the current data is the same as the data already loaded in color register 160. Last color block 212 contains a register 214 which matches the data already loaded in color register 160. Thus, select logic block 220 is able to make appropriate selection between a block write and a normal write.

When block write is selected and the data to be written to the DRAM array of the VRAM is different from the data in the color register, register 214 of last color block 212 will be updated.

The data stored in data register 204 (together with other information) is stored in one row of a data FIFO 226 (the "data row"). FIFO 226 is preferably organized into 16 rows. Each row contains a data field of 32-bits (i.e., one DWORD), a data count field of 4-bits and possibly other fields designed for special purposes. When a normal write is selected, the data count field represents the number of consecutive DWORDs which are identical. The content of this field is the same as the content of counter 222. When a block write is selected the data count field represents the number of block write operations to be performed. In this case, the data in the data field is the same as the data in data register 204 and the value in the data count field is obtained from counter 222, with the necessary conversion from the number of identical DWORDs (represented by the value of counter 222) to the number of block write operations.

When a normal write is selected and the data stream contains consecutive DWORDs that are the same (but not enough identical DWORDs to trigger a block write), the same data row is written over with the exception that the data count field is increased by one each time. In a different embodiment of the invention, the data row is written only once after select logic block 220 determines the exact number of identical DWORDs.

Automatic block write controller 200 also comprises a control FIFO 228 for storing address information and the "type" signal. In one embodiment of the present invention, control FIFO 228 contains 16 "control" rows each having 26 bits: a 20-bit start address field, a 4-bit control count field, and a 2-bit type field. Control FIFO 228 is connected to an address logic block 230, which is coupled to an address bus 232. Address logic block contains a register 236 for storing the start address of a control row. Address logic block 230 also contains a control counter 234, which is incremented for each DWORD in the input stream. Counter 234 is reset when the type state becomes a "block write" or when the incremented value exceeds the maximum allowable value (e.g., 16 for a 4 bit counter) or at the end of the data stream. Before counter 234 is reset, address logic block 230 writes the start address and the content of counter 234 to a control row in control FIFO 228. At the same time, select logic block 220 writes the "type" state to the type field of the control row.

For a normal write, it is possible that more than one data row may be written before the writing of a control row. As an example, assume that a data stream contains six DWORDs: three identical DWORDs of a first data value followed by two identical DWORDs of a second data value, and then followed by another DWORD of a third data value. When the first DWORD (having the first data value) is read, a data row is allocated. Register 236 of address logic block now contains the start address of this data row. The value of control counter 234 is initialized to zero. The value of control counter 234 is set to three as a new data row (having a second data value) corresponding to the fourth DWORD is allocated. The start address in register 236 remains unchanged. Both register 236 and control counter 234 remain at the same value as the fifth DWORD is written because no new data row is allocated (only the data count is changed). After the sixth DWORD is read, a different data row is allocated (having a third data value). At that time, the value of control counter 234 is changed to five (i.e., the sum of the value originally stored in control counter 234 and the value of the data counter in the data row corresponding to the second data value) while the content of register 236 remains unchanged. Assuming that the next set of DWORDs triggers the allocation of a control row, the contents of register 236 and control counter 234 will be used in the start address and control count fields, respectively, of the control row. Thus, the content of the control count may be different from the content of the data count in data FIFO 226. Similarly, the number of data rows may not be the same as the number of control rows. Specifically, there will be 3 data rows (the first row has a data count of three, the second row has a data count of two, and a third row has a data count of one) and one control row having a control count of six.

Data FIFO 226 and control FIFO 228 are connected to a VRAM driver 240, which is used to control the writing of data in a VRAM. VRAM driver 240 uses the control row to generate address signals. It sends out bursts of address signals, starting from the start address and the number of bursts is governed by the control count, in synchronization with data (obtained from data FIFO 226) being sent out to the DRAM array in a VRAM.

When a block write is selected, a new control row is allocated in control FIFO 228 with the type field set to "color write." A corresponding data row is also allocated in data FIFO 226. These two rows cause VRAM driver 240 to write appropriate data to the color register. Of course, when select logic block 220 determines that the correct color value has previously been loaded in the color register, as indicated by register 214 in last color block 212, there is no need to allocate this control row.

After a row is allocated in data FIFO 226 and control FIFO 228 for color write (if needed), the next data row and control row are allocated for a block write. For block writes, there will be a one-to-one correspondence for rows in the data FIFO 226 and control FIFO 228. Thus, there is no need to have two separate count fields (data count and control count). In the preferred embodiment, the data count and control count are combined as a single counter having a length equal to the sum of the data and control count fields. In one embodiment of the invention, the most significant bits of the combined count field are stored in the control count while the least significant bits are stored in the data count. For example, if the data and control count fields are each 4 bits long (able to count up to 16), the combined count would be 8 bits (able to count up to 256). This combined count indicates the number of block writes need to be applied to the data stored in the data row of data FIFO 226.

Figure 7:
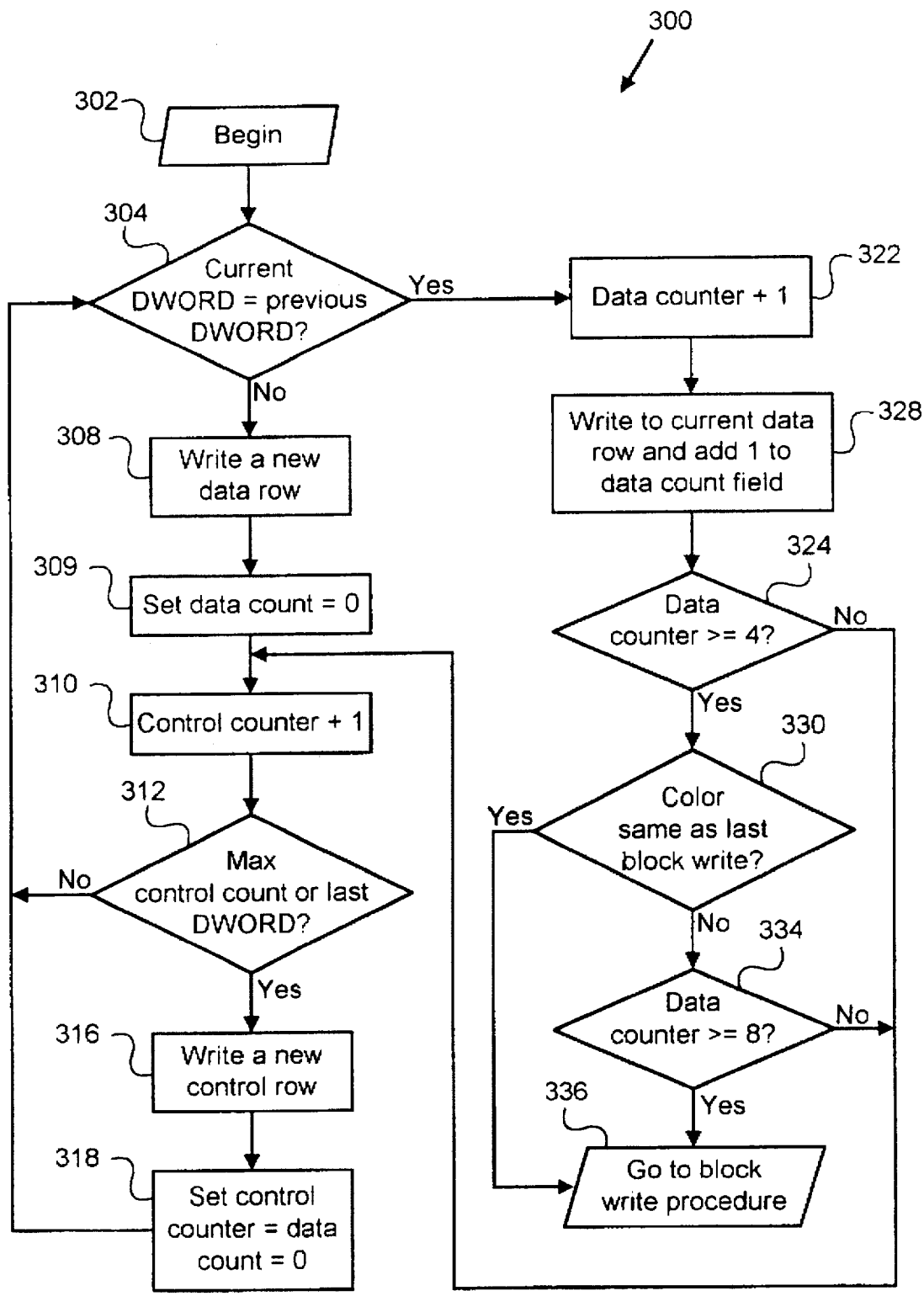
FIG. 7 is a flow chart showing the factors involved in writing to a data FIFO and a control FIFO for a normal write in accordance with the present invention.

FIG. 7 is a flow chart 300 showing the factors involved in writing to data FIFO 226 and control FIFO 228 for a normal write. Flow chart 300 begins at step 302. At step 304, the current DWORD (e.g., at data register 202 of FIG. 6) is compared to the previous DWORD (e.g., at data register 204). By definition, the comparison is false at the start of a data stream. If they are not the same, a new data row is allocated in data FIFO 226 (step 308) and the data counter is cleared to zero (step 309). The value of the data count field is the same as the value of data counter 222 and the data field is the same as the DWORD in data register 204.

At this point, it is not known whether a new control row needs to be allocated. The value of the control counter 234 is increased by one (step 310). In step 312, flow chart 300 determines whether the value of control counter 234 exceeds the maximum control count or whether this is the last DWORD. If the answer is positive, a new control row is allocated (step 316). The start address field is set to the start address stored in register 236 of address logic block 230.

The value of control counter 234 (which is less than 16) is transferred to the control count field. In step 318, control counter 234 and data counter 222 are set to zero for a new data row. The start address contained in register 236 is changed to the start address of the new data row. Information in control counter 234 and register 236 will be used as the basis for the next control row. If the answer to step 312 is negative, no new control row is allocated and flow chart 300 branches back to step 304.

Figure 8:
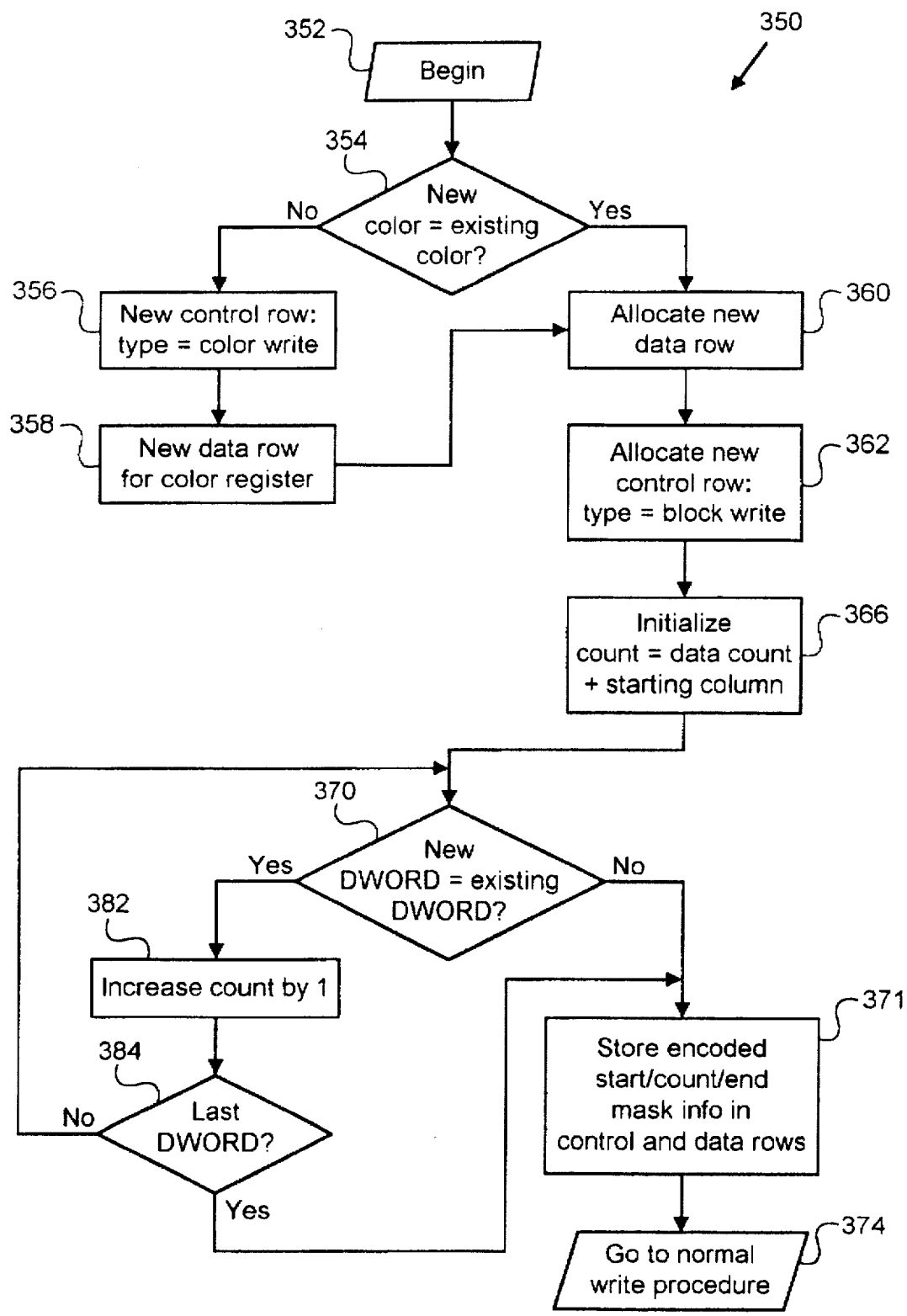
FIG. 8 is a flow chart showing the factors involved in writing to a data FIFO and a control FIFO for a block write in accordance with the present invention.

If the comparison of the DWORDs in step 304 indicates that the current DWORD is the same as the previous DWORD, the value of data counter 222 is increased by one (step 322). In step 328, the current data row is written into the same row in data FIFO 226 with the value of the data count field increased by one. The value of the data counter is compared to four (step 324). If the value is less than four, block write is not yet indicated. Flow chart 300 branches to step 310 and processing continues as above. If the value in step 324 is equal to or exceeds four, register 214 in last color block 212 is checked to determine if color register 160 needs to be updated (step 330). If there is no need to update (i.e., the current color is the same as the previous color), flow chart branches to step 336, in which a block write procedure, described in FIG. 8, is performed. If there is a need to update color register 160 (i.e., the current color is different from the previous color), flow chart 300 then determines if the value of data counter 222 is equal to or exceeds eight (step 334). If the answer is positive, flow chart 300 goes to step 336 to initiate a block write procedure. If the answer is negative, flow chart 300 again goes to step 310.

FIG. 8 is a flow chart 350 showing the factors involved in writing to data FIFO 226 and control FIFO 228 for a block write. Flow chart 350 begins at step 352. At step 354, the new color is compared with the existing value of the color register (which is stored in register 214 of last color block 212). If they are not the same, flow chart 350 branches to step 356 where a new control row with type equal to "color write" is allocated. A data row in which the data field corresponds to the new value of the color register is also allocated (step 358). As pointed out above, VRAM driver 240 will use these information to write to color register 160. Flow chart 350 then goes to a step 360.

When the new color is the same as the existing color, step 354 goes to step 360 directly, without going through steps 356 and 358. In step 360, a new data row is allocated in which the data is the DWORDs for one or more block write operations (the exact number will be determined in later steps). In step 362, a control row is allocated in which the type field is set to "block write." In step 366, the count field (which is a combination of the data count and control count fields) is initialized to the total number of DWORDS that should be represented by a current block write count. This number is equal to the current DWORD count plus the starting column number (the column the first DWORD will be written to within a n-column block in the VRAM) which for a 4-column block write VRAM will range between zero and three as determined by starting address bits one and zero. The starting column number will thus be taken into account as it must be when deriving the eventual block write count. A new DWORD is read into data register 202 of FIG. 6 and compared with the DWORD of data register 204 (step 370). If the new DWORD is not the same as the existing DWORD, there is no more data for block write. At the end of bock write data, a block write count along with starting and ending column mask information must be stored into the control and data rows allocated in the result FIFOs 226 and 228 (step 371). The block write count is the final DWORD count divided by the number of columns written by each block write cycle for the selected VRAM type. The starting column mask information comes from the starting address held in register 236 and is stored in the address field of control FIFO 228, and indicates which columns if any should be masked off in the first block write cycle. The ending column mask information comes from the address that accompanies the last DWORD of block write data, and indicates which columns if any should be masked off in the last block write cycle, and is encoded into an enable field in data FIFO 226. Flow chart 350 then goes to the normal write procedure of FIG. 7 (step 374).

If the new DWORD is the same as the existing DWORD, flow chart branches to step 382 which increase the DWORD count by one. No new data row or control row needs to be allocated. In step 384, the current DWORD is checked to see if it is flagged as the last DWORD in the current input stream. If the answer is positive, flow chart 350 branches to step 371 and stores the block write information into the result FIFOs just as it does if a new data value is encountered. If the answer is negative, flow chart 350 branches to step 370 to determine if there are additional DWORDs which are the same as the existing DWORD.

In an alternate implementation, both color write and block write information as just described can be stored in a single control/data row pair. In this implementation, control type "color write" implies that the information stored in the count, address, and enable fields indicate block write VRAM cycles that should follow the color register write using the value held in the data field. If it is determined that a color write is not needed, the type is set to "block write" and the data field is ignored.

Figure 9:
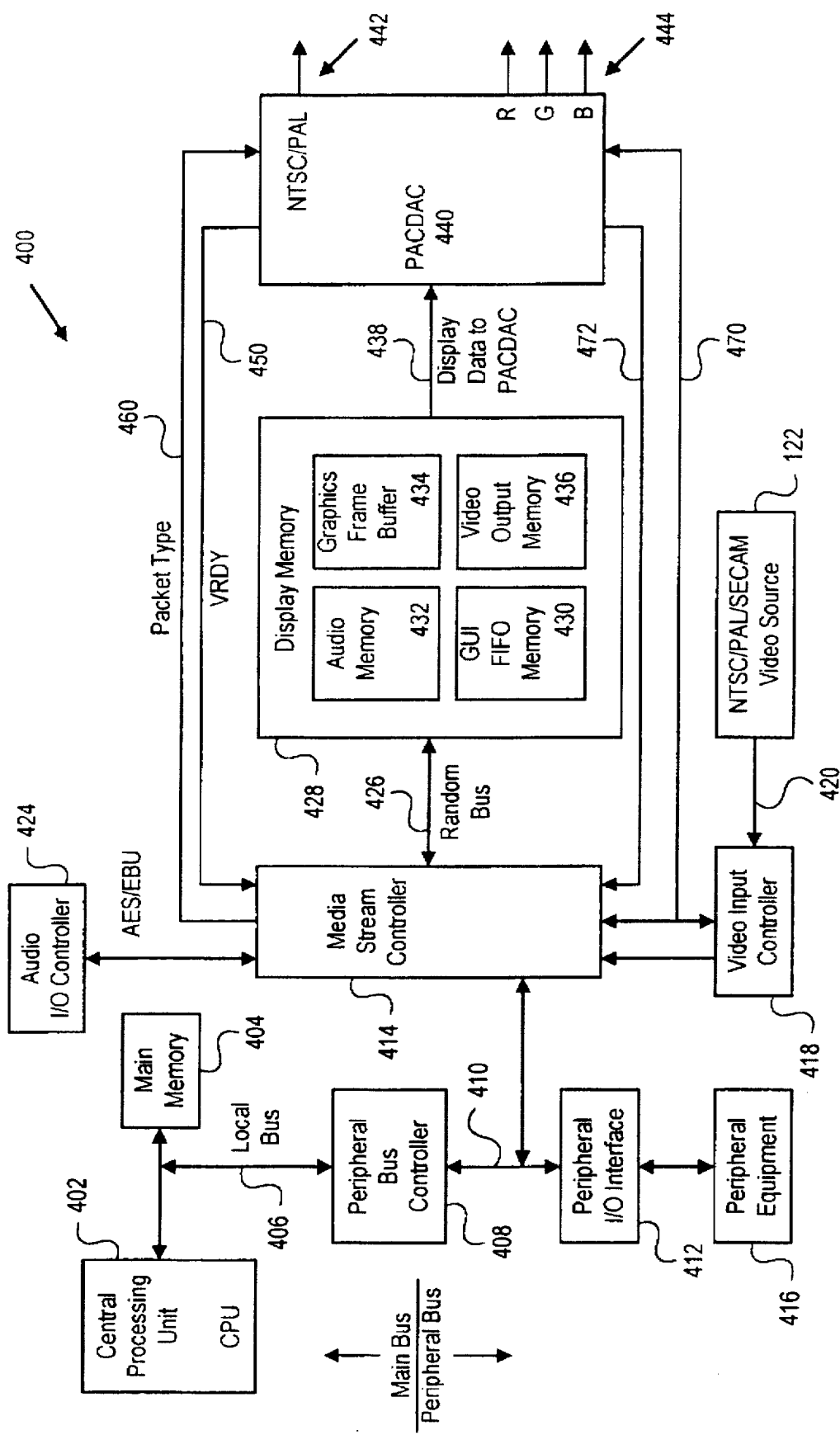
FIG. 9 is a simplified block diagram illustrating a system incorporating the present invention for producing a composite video signal in a personal computer.

One application of the present invention is an automatic block write controller used in a novel multimedia system. FIG. 9 is a simplified block diagram illustrating such a system, generally indicated at 400, for producing a composite video signal in a personal computer. Referring to FIG. 9, this system includes a central processing unit (CPU) 402 and a main memory 404 for storing both executable commands and data for the system. In the system of FIG. 9, the CPU 402 and the main memory 404 are connected to a local bus 406. The system 400 shown in FIG. 9 also includes peripheral bus controller 408 connected to the local bus 406. In system 400 the peripheral bus controller 408 provides a PCI bus system although other bus systems may be supported. A peripheral bus 410 has a common connection with the peripheral bus controller 408, with a peripheral I/O interface 412 and with media stream controller 414. While the peripheral bus 410 is coupled to the local bus using peripheral bus controller 408 in this system, other system may be adapted to support other methods of connecting to the local bus, such as direct connection, buffered connection or connection through a combined cache/bridge. Examples of alternative embodiments have been disclosed in a copending patent application, Ser. No. 08/337,350 filed Nov. 10, 1994 and entitled "System and Method for Generating Video in a Computer System," which is incorporated herein by reference.

Referring to FIG. 9, the peripheral I/O interface 412 is connected to peripheral equipment 416. The peripheral bus 410 in this system may be a PCI bus which provides a data bandwidth of thirty two (32) bits in parallel and which may in the future provide as many as sixty four (64) bits in parallel. The peripheral equipment 416 may illustratively be a printer or disk drive which is operated in accordance with commands from the CPU 402. One of ordinary skill in the art will appreciate the interconnection and operation of these components.

Figure 10:
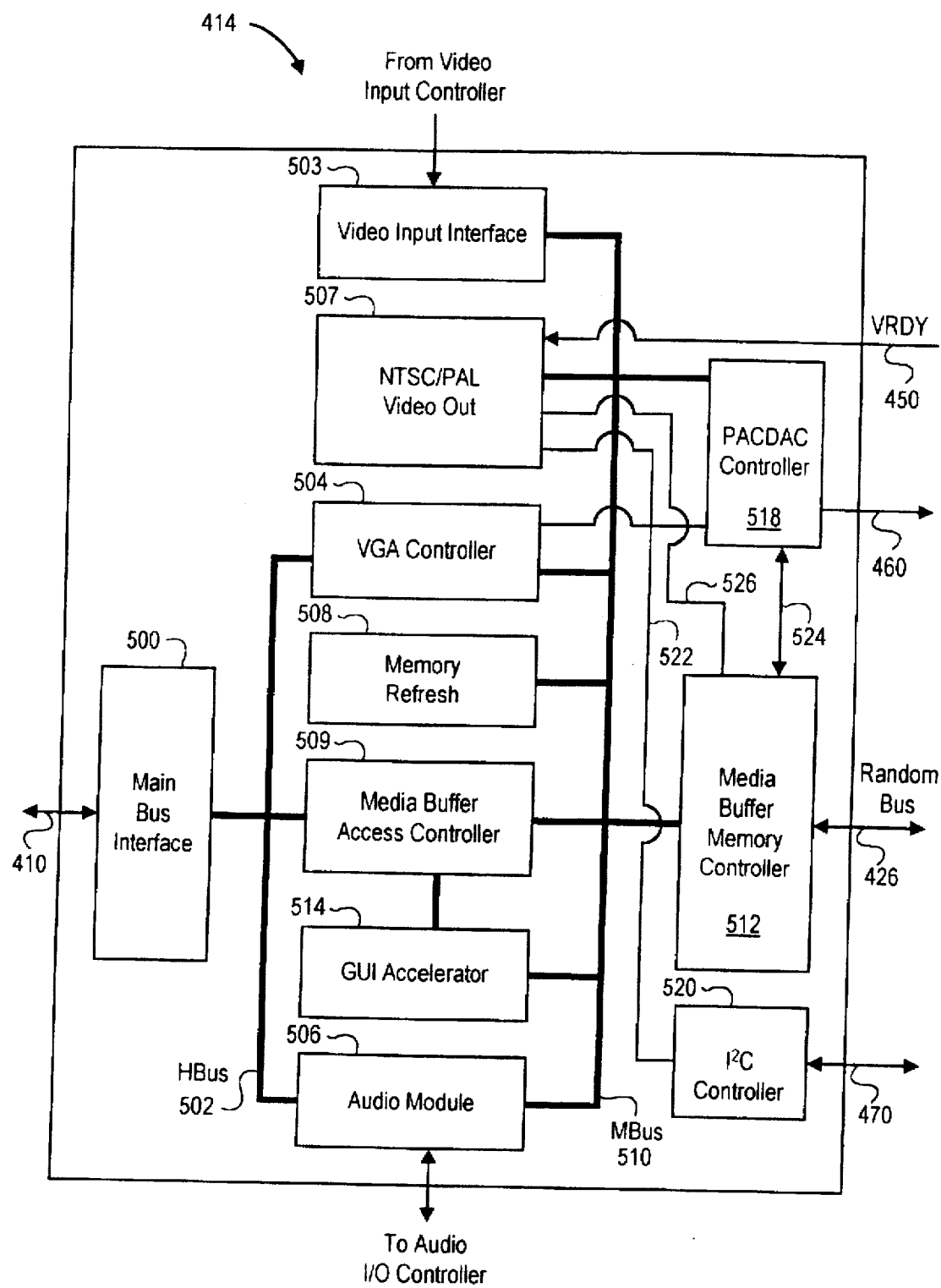
FIG. 10 shows a portion of a media stream controller incorporating the present invention.

The peripheral bus 410 shown in FIG. 9 is coupled to a media stream controller 414 shown as a single block in FIG. 9 and as a simplified block diagram in FIG. 10. The media stream controller 414 may be disposed on an integrated circuit chip. The automatic block write controller of the present invention is included in media stream controller 414.

Referring to FIG. 9, the media stream controller 414 receives inputs from a video input controller 418. The video input controller 418 receives video inputs through a bus 420 from a video source 422 which may be constructed in a conventional manner. The media stream controller 414 also receives inputs from, and provides outputs to, an audio I/O controller 424 which may be constructed in a conventional manner. The audio I/O controller 424 may provide sound output to speakers or some other sound output device (not shown) or receive inputs from a speaker or other sound input device (not shown). Preferably, a standard AES/EBU serial audio interface is used for communication between the media stream controller 414 and audio I/O controller 424. The audio subsystem and related portions of system 400 are described in further detail in co-pending application Ser. No. 08/337,924 filed Nov. 10, 1994 in the names of Paul B. Wood and Marc M. Stimak as joint inventors, titled "System and Method for Command Processing and Data Transfer in a Computer System for Sound or the Like", assigned of record to the assignee of record of this application, and which is incorporated herein by reference.

A random bus 426 is common with the media stream controller 414 and a display memory 428. Preferably, random bus 426 allows for a high rate of data transfer between the media stream controller 414 and the display memory 428. In system 400, random bus 426 supports a data transfer rate of approximately 100 megabits/second (100 Mbs) and includes a thirty two (32) bit wide data bus.

The display memory 428 has different portions for storing data and control information related to various media subsystems. For example, the display memory 428 has a portion 430 designated as a "GUI FIFO memory" for storing commands on an overflow basis. The GUI FIFO memory portion 430 and related portions of the system are disclosed in detail in co-pending application Ser. No. 08/337,939 (attorney's file D-2793) filed on Nov. 10, 1994 in the names of David C. Baker and Michael D. Asal inventors, titled "System for, and Method of, Processing in Hardware Commands Received from Software without Polling of the Hardware by the Software", assigned of record to the assignee of record of this application, and which is hereby incorporated herein by reference. The display memory 428 also has an audio memory portion 432 for storing information related to digital sound I/O. The audio memory 432 is described in further detail in the above described co-pending application Ser. No. 08/337,924. The display memory 428 also includes a graphics frame buffer memory 434 for storing graphics data, such as data for a look-up table, and a video output memory 436 for storing digital composite video data. A video input memory portion (not shown) may also be provided. A system for storing graphics data and video data in different portions of a display memory is disclosed in detail and claimed in co-pending application Ser. No. 08/014,359 filed Feb. 5, 1993, (attorney's file D-2657) in the names of Jonathan I. Siann, Conrad M. Coffey and Jeffrey L. Easley, titled "System for, and Method of, Displaying Information from a Graphics Memory and a Video Memory on a Display Monitor", assigned of record to the assignee of record of this application, and which is hereby incorporated herein by reference.

It will be recognized that not all portions of the display memory 428 need be active or resident at the same time. For instance, in system 400 video input and composite video output will not both be active at the same time due to memory and bandwidth constraints. In fact, system 400 generally only provides memory and graphics refresh while converting and outputting composite video signals. However, memory and bandwidth may be increased in alternative systems to allow additional media subsystems to function concurrently.

The system shown in FIG. 9 includes a display memory 428 using video random access memory (VRAM). Using video random access memory for display memory 428 has certain advantages because it operates at a relatively high serial output clock speed and because it includes a serial output register for shifting out digital data taken from different positions in the display memory.

The outputs from the graphics frame buffer memory 434 and the video output memory 436 may be provided on a line 438 designated as "Display Data to PACDAC". The output on the line 438 is provided to PACDAC 440 and may include both data and control information from display memory 428. The term "PACDAC" refers to a packet based digital-to-analog converter (DAC). A PACDAC and related portions of the system are described in detail and claimed in co-pending application Ser. No. 08/214,787 filed Mar. 16, 1994 (attorney's file D-2717), in the names of David C. Baker and Jonathan I. Siann, titled "Multimedia Graphics System", assigned of record to the assignee of record of this application, and which is hereby incorporated herein by reference. The PACDAC uses a first-in/first-out buffer (FIFO) to buffer video, graphics or control related packets received from display memory 428. The video or graphics related packets may be converted to analog form and output to a video or graphics device. Preferably line 438 allows for a high rate of data transfer between display memory 428 and PACDAC 440. In the first embodiment, line 438 supports a data transfer rate of approximately two hundred megabits/second (200 Mbs) and includes a thirty two (32) bit wide data bus.

In addition to receiving data and control information across line 438, PACDAC 440 receives control information from media stream controller 414 across line 460, also designated as "Packet Type" in FIG. 9. This control information indicates the type of packet (video, graphics, control information etc.) that is being sent to the PACDAC 440 at any given time. PACDAC 440 also provides certain information to media stream controller 414. The PACDAC provides a video ready signal (VRDY) to the media stream controller 414 across line 450, also designated as "VRDY" in FIG. 9. The video ready signal indicates to the media stream controller 414 that PACDAC 440 is ready to receive video related data from display memory 428. The PACDAC 440 also provides media stream controller 414 with certain status information across a bus 470, which is preferably a standard I²C bus.

Clocking information may also be generated in the PACDAC 440 of the first embodiment. In one embodiment, dock signals having frequencies of approximately 16.9344 Megahertz (MHz) and 24.576 MHz are generated. These clock signals may be provided to the media stream controller 414 across line 472. The 24.576 MHz dock signal may be divided in half by media stream controller 414 to produce a 12.288 MHz clock signal. This provides a 12.288 MHz dock signal in addition to the 16.9344 MHz clock signal. Both the 12.288 MHz and 16.9344 MHz clock signals are used for audio processing in the first embodiment. The 24.576 MHz clock signal may also be doubled (to almost 50 MHz) or quadrupled (to almost 100 MHz) to provide for high speed clocking inside the media stream controller 414. The 16.9344 MHz and 24.576 MHz clock signals are also used in PACDAC 440 to control video and graphics processing.

The PACDAC 440 of the first embodiment uses a FIFO and DAC to generate an analog composite video signal from data stored in the display memory 428. The composite video signal of the first embodiment may be provided to a video device, such as a VCR, NTSC/PAL monitor, or the like, through the NTSC/PAL port 442. In addition, the PACDAC may have a random access memory (RAM) and additional digital-to-analog converters for graphics. For graphics, the binary information in the graphics frame buffer memory 434 may represent positions in a RAM look-up table and these positions may have binary indications representing pseudo colors. These binary indications are converted to analog values by digital-to-analog converters to provide the colors at the different pixel positions on the graphics display monitor through ports 444 labeled RGB. As disclosed in co-pending application Ser. No. 08/014,359, video information from a video input memory (not shown) may also be converted to a form compatible with the graphics information for the graphics frame buffer memory 434 and this convened video information may be shown in a display monitor through ports 444.

The primary coordination among the various media components of system 400 is provided by media stream controller 414. Portions of media stream controller 414 are shown in additional detail in FIG. 10. Referring to FIG. 10, the media stream controller 414 communicates with the peripheral bus 410 through a main bus interface 500. The main bus interface 500 is connected to an internal 3-state Hbus 502 allowing communication with various functional modules attached to the Hbus. These modules may include, among other things, a video input interface 503 for receiving video data, a VGA controller 504 for graphics, an audio module 506 for sound, an NTSC/PAL video out module 507 for outputting video data, a memory refresh module 508 for controlling the refresh of the display memory 428, and a media buffer access controller 509 which may allow data to pass through the media stream controller to the display memory via an MBUS 510 and media buffer memory controller 512. A GUI accelerator 514 may also be provided as shown. Other modules such as flash ROM or Yamaha OPL support may also be added to the Hbus.

Each of these modules is connected to an internal MBUS 510 which provides communication with media buffer memory controller 512. The media buffer memory controller 512 is a memory controller for display memory 428, and communicates with the display memory across random bus 426. Each of the modules may transfer packets of data to and/or from the display memory via MBUS 510, media buffer memory controller 512, and random bus 426. It is highly desirable to be able to reduce traffic on MBUS 510 and random bus 426 because they are shared by multiple, high bandwidth multimedia components.

A PACDAC controller 518 is also provided in the media stream controller 414. The PACDAC controller provides control information to PACDAC 440. The PACDAC controller 518 is connected to MBUS 510 and may transfer packets of PACDAC control data to media buffer memory controller 512 over MBUS 510. In addition, the PACDAC controller 518 may send other PACDAC control information to media buffer access controller 512 across line 524. Control information for the PACDAC may then be sent through the display memory 428 to the PACDAC 440. The PACDAC controller 518 also provides signals to PACDAC 440 on line 460, also designated as "Packet Type" in FIG. 9, which indicate whether a packet received by the PACDAC 440 from the display memory 428 contains control information or video or graphics related information.

The VGA controller 504, NTSC/PAL video out 507, PACDAC controller 518, and an I²C controller 520 are connected to, and may communicate across bus 252. The media stream controller 414 may communicate with other portions of the multimedia system of the first embodiment through the video input interface 503, audio module 506, media buffer memory controller 512, PACDAC controller 518, and I²C interface 520. Preferably, standard interfaces such as AES/EBU and I²C are supported.

In addition, the NTSC/PAL video out module 507 may receive a video ready signal from PACDAC 440 over VRDY line 450. A signal on VRDY line 450 indicates that the PACDAC 440 is ready to receive packet(s) of digital composite video data which are converted by the PACDAC 440 to produce an analog composite video signal. When the NTSC/PAL video out module receives a video ready signal, it sends a request to the media buffer memory controller 512 over MBUS 510. The media buffer memory controller 512 then causes the requested packet of digital composite video data to be transferred to the PACDAC from display memory 428. Once the request from the NTSC/PAL video out module 507 has been serviced, the media buffer memory controller sends an acknowledgment signal to the NTSC/PAL video out module 507 over line 526. The NTSC/PAL video out module 507 will not send additional video related packets in response to a video ready signal until the acknowledgment signal has been received. This allows PACDAC 440 to receive the first packet and to deassert the video ready signal if necessary to prevent additional packets from being sent by the NTSC/PAL video out module 507.

Figure 11:
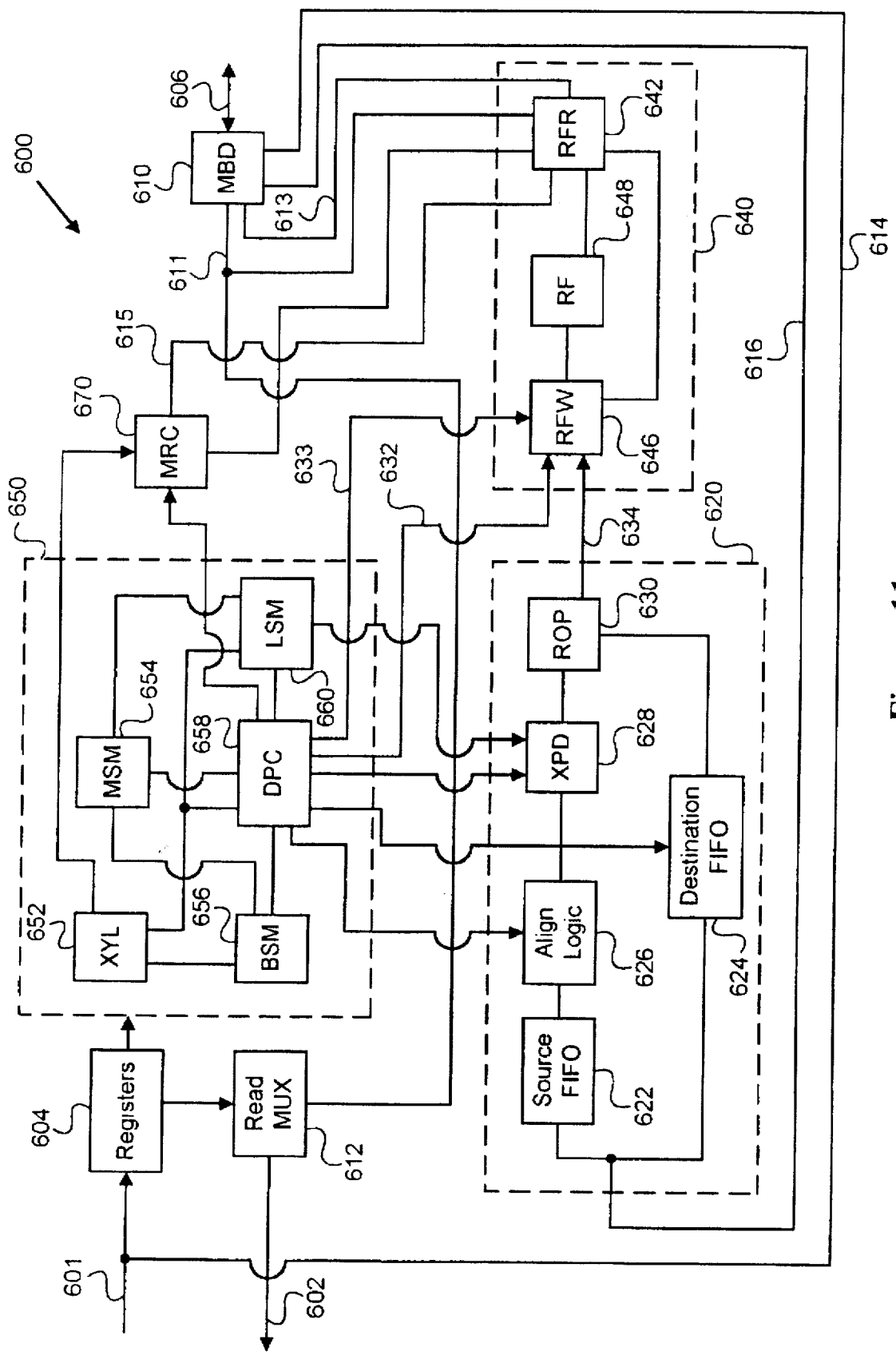
FIG. 11 is a block diagram of a circuit incorporating an automatic block write logic of the present invention.

FIG. 11 shows a circuit 600 for implementing automatic block write in system 400 of FIG. 9. Circuit 600 is included in the GUI Accelerator 514 inside media stream controller 414. It contains an input line 601 and an output line 602 which are connected to H-BUS 502 through circuits (not shown) in media buffer access controller 509. Circuit 600 also contains an bidirectional line 606 which is connected to MBUS 510. The advantages of this arrangement are: (a) reduce MBUS traffic, (b) reduce random bus traffic, (c) speed up writes to VRAM, and (d) work with Raster ops even where data is never sent to application programs over the PCI bus.

Line 606 is connected to MBUS driver (MBD) 610 which provides a tri-state connection between the rest of circuit 600 to MBUS 510 as well as a multiplexing capability to control access thereto. The following is a description of various data paths controlled by MBD 610.

Data read from result FIFO reader (RFR) 642 on data line 611 goes to both MBD 610 and Read MUX 612. The data pass through a "read MUX" 612 to output line 602. The data is eventually coupled to H-BUS 502 through circuits in media buffer access controller 509.

The multiplexer in MBD 610 is able to couple data from either input line 601 or MBUS 510 to an raster operation (ROP) path 616. Thus, one data path involves receiving input data from input line 601 and passing through a line 614 to MBD 610, which sends the data to an raster operation path 616. This data passes through a raster operation (ROP) logic 620 and an automatic block write logic 640 before returning to MDB 610. MBD 610 then couples the data in automatic block write logic 640 to MBUS 510. This data is then written into display memory 428 of FIG. 9.

When a raster operation occurs, data in display memory 428 passes through MBUS 510 to MBD 610, which couples the data to ROP path 616. The data is processed by ROP logic 620 and then pass back to MBD 610 through a result FIFO read (RFR) block 642 in automatic block write logic 640 via data line 611. MBD 610 then couples the processed data to MBUS 510, which directs the data to display memory 428 using the address supplied by RFR 642 via address line 613.

The operation of circuit 600 is controller by various registers (approximately 60) in a control register fie 604. These registers have memory mapped I/O addresses and control register file 604 is connected to input line 601. Consequently, they can be written into by software via memory mapped I/O registers. When these registers are addressed, data can be sent from HBUS 502 through input line 601 to the addressed registers. Control register file 604 is also connected to read MUX 612. Thus, the data in the registers in file 604 can be selectively coupled to output line 602 through read MUX 612. As a result, the content of the registers in file 604 can be read.

Control register file 604 is connected to a control logic block 650. Control logic block 650 comprises a XY-to-linear (XYL) logic 652 which converts "X,Y" pixel addresses to linear display memory addresses for reading and writing. Control logic block 650 also comprises a main state machine (MSM) block 654, BLT state machine (BSM) block 656, data path controller (DPC) 658 and line state machine (LSM) block 660. BSM block 656 is for BLT raster operation control. DPC 658 controls how data passes through the raster processing path. DPC 658 also controls the timing and provides enable and address signals to a result FIFO write (RFW) 646 in automatic block write logic 640. DPC 658 also sets up the memory request controller (MRC) 670 to make data fetches as necessary to fill Source FIFO 622 and Destination FIFO 624 with operand data. LSM block 660 controls drawing of lines in display memory 428 byproviding inputs to DPC 658.

The structure of ROP logic 620 is now described. ROP logic 620 allows raster operation to be processed. It includes a source FIFO 622 and a destination FIFO 624. They can be loaded with data from different portions of display memory 428 to allow certain operations (such as an XOR) between blocks of data in display memory 428. For most operations (such as a simple data copy), destination FIFO 624 is not used and the data passes through source FIFO 622. The data passes from source FIFO 622 to alignment logic 626 which can be used to align data to certain memory locations. The data is then coupled to an expand-mono-to-color (XPD) block 628 which allows mono data (with a single background and foreground color) to be expanded. Mono data is commonly used for text. It is compressed since it does not include information on the actual background and foreground color. The background and foreground data are stored in registers in control register files 604.

The last block in ROP logic 620 is an ROP block 630. It is a logical operations unit performing such functions as logical AND, OR, XOR, and data inversion. The output from ROP block 630 is a stream DWORDs of graphic data that accompanies a stream 20-bit addresses from DPC 658. The addresses correspond to the locations of the data in display memory 428. The graphic data and addresses are sent to a result FIFO write (RFW) block 646 of automatic block write logic 640 via lines 632 and 632, respectively.

Automatic block write logic 640 includes result FIFO write (RFW) block 646, result FIFO (RF) block 648 and result FIFO read (RFR) block 642. The inputs to RFW 646 of automatic block write logic 640 include graphic data from ROP block 630 and addresses an 8 bit enable signal from DPC 658. Basically, RFW 646 checks for repetitive data in the data stream and determines whether a block write operation should be performed. The data is stored in the RF 648 with a type code indicating whether a block write should be used. RFR 642 reads the data out of RF 648 and handshakes with MRC 670 to send the data through MBD 610 onto MBUS 510. One of the functions of MRC 670 is to handle MBUS protocol in that it initiates all MBUS requests required by the GUI Accelerator 600. When MRC 670 determines that all previous MBUS requests are complete, it determines whether another read or write request is required using control informtion from XYL logic 652, DPC 658, and RFR 642. Ira read request is required, it sends a read request signal to MBUS 510, supplies a starting read address/count to RFR 642 via address line 615, and tells RFR 642 to supply an MBUS read type and the read address/count to MBD 610. Otherwise, if RFR 642 has informed MRC 670 that valid MBUS write data is available in RF 648, MRC 670 sends a write request signal to MBUS 510 and tells RFR 642 when to supply the appropriate write type/data/count as decoded from the contents of RF 648 to MBD 610. As MRC 670 receives ack signals from MBUS 510, it tells RFR 642 to increment the address, decrement the count, and supply the next DWORD of write data on write operations. RFR tells MRC 670 when the count reaches zero, thus signaling the end of the current MBUS request.

When automatic block write logic 640 is compared with automatic block write controller 200 of FIG. 6, it can be seen that RFW 642 corresponds to data registers 202 and 204, compare logic 210, last color block 212, select logic 220 and address logic 230. RF 648 corresponds to data FIFO 226 and control logic 228. RFR 642 and MBD 610 correspond to VRAM driver 240.

Figure 12:
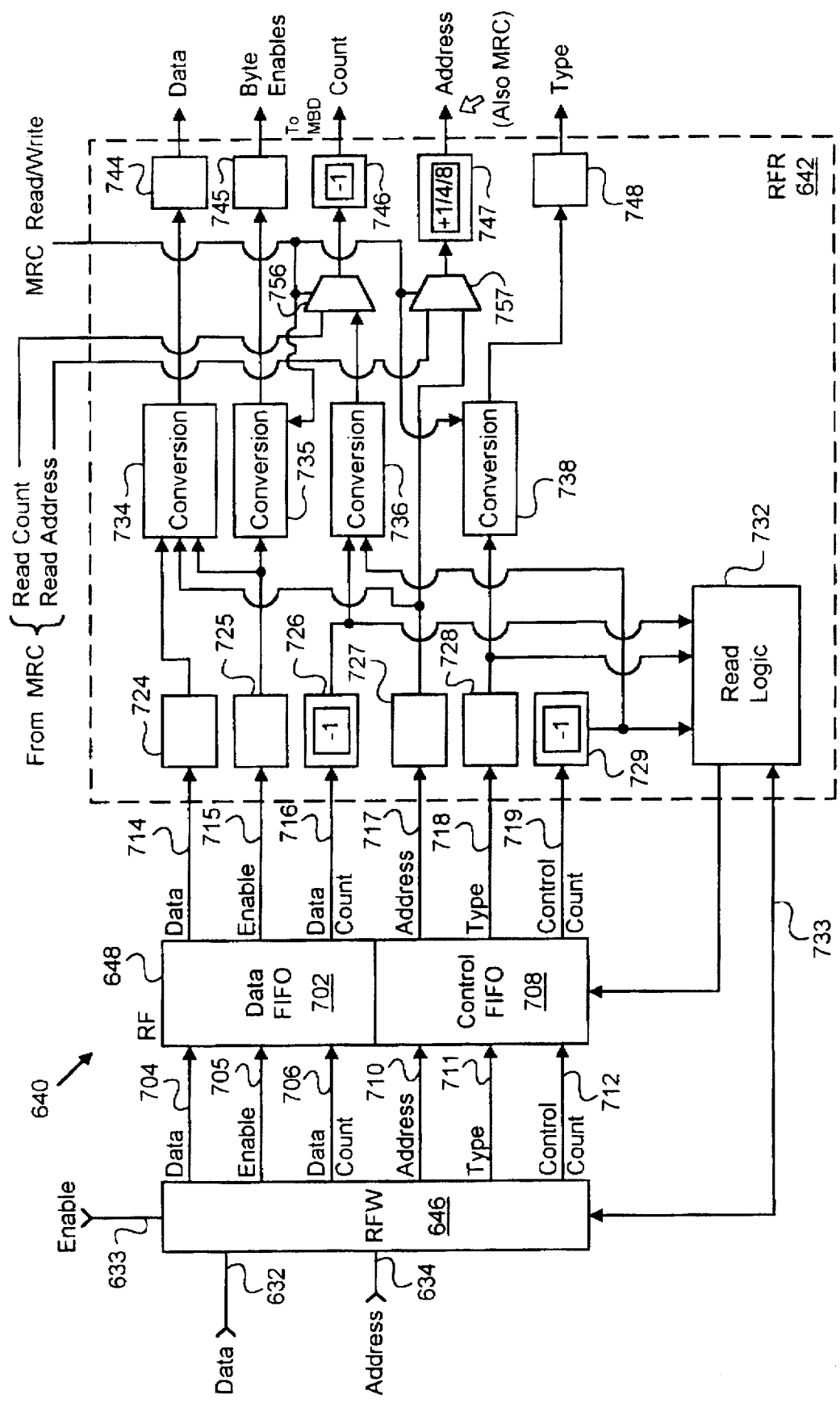
FIG. 12 is a block diagram showing the details of an automatic block write logic of the present invention.

FIG. 12 is a block diagram showing the details of automatic block write logic 640. Components in FIGS. 11 and 12 that are the same use the same reference numerals. As discussed above, RFW 646 receives data and address from lines 632 and 634, respectively, which are connected to ROP block 630 of FIG. 11. RFW 646 also receives an enable signal from line 633, which is connected to DPC 658 of FIG. 11. RFW 646 packs the enable signal with the data and data count signals and places them in an enable field, data field and data count field, respectively, in data FIFO 702 of RF 648. With the exception of processing the enable signal as described above, RFW 646 operates in substantially the same way as the corresponding structure in FIG. 6.

RFW 646 sends data, enable, and data count information to data FIFO 702 through lines 704-706, respectively. Data FIFO 702 corresponds to data FIFO 226 of FIG. 6. As explained above in connection with FIG. 6, each data row in data FIFO contains fields for data and data count. In this case, an additional enable field is assigned to each data row for storing the state of the enable signal.

RFW 646 sends address, type, and control count information to a control FIFO 708 through lines 710-712, respectively. Control FIFO 708 corresponds to control FIFO 228 of FIG. 6.

RFR 642 then reads data, enable, data count, address, type, and control count out of RF 648 through lines 714-719, respectively. The signal on these lines are latched into latches 724-729, respectively. The job of RFR 642 is to reverse the work of RFW 646; whatever RFW has put into RF 648, RFR 642 must pull out at the appropriate time and decode the information RFW 646 has stored. RFR massages the information as appropriate to produce MBUS cycles that will result in the result DWORD stream generated by ROP logic 620 being stored in display memory 428 in an efficient manner. RFR 642 contains a read logic 732 which communicates with RFW 646 using a line 733 for coordinating the reading and writing of control FIFO 708. This coordination is necessary to avoid FIFO overrun and underrun during reading and writing. Because control FIFO 708 contains sixteen control row, four bits are required to identify the rows during reading and four bits are required to identify the rows during writing. Thus, line 733 contains eight physical lines to pass FIFO read and write addresses between RFW 646 and RFR 642, plus an additional line to indicate a FIFO full condition.

RFW 646 and Read logic 732 use ordinary circular pointer logic to manage the space available in RF 648. Read logic 732 compares the control FIFO read address it generates against the control FIFO write address received from RFW 646 to determine whether there is valid write data in RF 648. If the read and write address are equal the RF is either full or empty, as distinguished by the RF full signal. If the RF is empty, the RFR must not try to read out of RF 648 or an underrun condition will result. Read logic 732 sends the data FIFO read address it generates back to RFW 646. RFW 646 compares the data FIFO write address it generates to the data FIFO read address received to determine when a DWORD write will fill the FIFO. Once the RF 648 is full, RFW 646 must wait for some data to drain through RFR 642 before writing any further DWORDs or an overrun condition will result. RFW 648 reports the FIFO full condition to DPC 658 which suspends data processing while the full condition persists.

When Read logic 732 determines that RF 648 is not empty, it informs MRC 670 of the condition. When MRC 670 tells RFR 642 that an MBUS write request has been initiated, Read logic 732 pulls the top FIFO entry into latches 724 through 729 and decodes the type held in latch 728 to determine what kind of write cycle (normal write, color write, block write) is to be performed.

Each time a new value is sent over to MBUS 510, new values are latched from the data and control rows. For non-block write, the data count is loaded into latch 726 and decremented each time a value is sent to MBUS 510. When the data count reaches zero, RFR 642 moves to the next data row of data FIFO 702. Similarly, the control count is loaded into latch 729 and decremented after each MBUS cycle. When the control count reaches zero, RFR 642 moves to the next control row of control FIFO 708.

For a block write, the data count and control count are concatenated. This combined count is decremented after each MBUS cycle. RFR 642 uses the same data row and control row until the combined count reaches zero. Then RFR 642 moves on to the next data row and control row. There is decrementer (subtract one) logic associated with data count latch 726 and control count latch 729. When Read logic 732 determines that the current data and/or control are still valid as evidenced by non-zero counts, it instructs latch 726 and/or 729 to load a decremented copy of the current value rather than loading a new value from RF 648.

Prior to sending information to MBUS 510, the information stored in latches 724, 725, 727 and 728 pass through latches 744, 745, 747 and 748, respectively. The information could be converted prior to reaching latches 744, 745, 747 and 748. Thus, in FIG. 12, conversion circuits 734 is inserted between latches 724 and 744. Similarly, conversion circuit 735 is inserted between latches 725 and 745, conversion circuit 736 is inserted between latches 726 and 746, and conversion circuit 738 is inserted between latches 728 and 748.

Conversion circuit 734 passes data from latch 724 straight through to latch 744 for normal write or color write cycles, but is needed to generate column masks for block write cycles (the block write data value is written during the color write cycle). Due to starting and ending address alignment within blocks, the first and last blocks may need to be only partially written. On the first block write cycle, the starting address is used to mask off columns in the block before the first column. On the last block write cycle, the data enables (which were generated by RFW 646 from the last column address) are used to mask off columns in the block after the last column address. Note that if the block write count stored is zero, there is only one block write cycle indicated which means the first block write column mask and the last block write column mask must be logically ANDed to generate the required column mask.

Note that in the relatively simple implementation of the automatic block write logic discussed so far, data repeat is restricted to complete DWORDs only, which simplifies column mask generation in that block write cycles other than the first or last have a column mask of all ones generated, meaning that all columns in the block are to be written. A more complex data analysis implementation could be used where a partial DWORD (perhaps indicated by byte or nibble enables, not all of which are active) is considered to match the previous DWORD if all enabled portions of the partial DWORD match the data held for data comparison. For this scheme, column mask data would have to be generated and held for each block DWORDs, resulting in increased result data storage requirements compared to the complete-DWORD-only scheme, and more complex logic in both RFW 646 and RFR 642. The benefit would be that more write cycles could be convened to block write cycles.

Conversion circuit 735 generates MBUS byte enables for various cycles. For normal write cycles, the odd-numbered enable signals from data FIFO 702 are selected to become the MBUS byte enable signals. For all other cycle types, the MBUS enables are forced to be all active.

Conversion circuit 736 generates counts for MBUS write cycles. For normal writes, the initial count is set equal to the control count from latch 729. For color writes the count is set equal to zero (do a single MBUS write cycle). For block writes the count is set to the least significant 3 bits of the combined current block write count held in latches 729 and 726.

Specifically, the type field is convened from a 2-bit field to a 4-bit field by conversion circuit 738. MBUS 510 supports up to sixteen types, thereby requiring four bits. On the other hand, RF 648 only stores a 2-bit field because only normal write, block write, and color write are involved. In addition, the read/write* signal from MRC 670 will cause the type conversion logic 738 to generate a read type for MRC read requests.

Similarly, the enable field needs to be convened.

The address asserted on MBUS 510 must be incremented after each cycle. For normal write, the address would be incremented by one DWORD after each write on MBUS 510. After each block write, the address would be incremented by four DWORDs for a four DWORD block write and by eight for a eight DWORD block write. There is address increment logic associated with address latch 747 that performs the required increment under control of Read Logic 732.

The MBUS count is held in latch 746 and is an n−1 based count of how many data phases are involved in the current MBUS request. Each time that MRC 670 reports that an MBUS ack has been received, decrement (subtract 1) logic associated with latch 746 causes the latch to be loaded with a decremented version of its current value. MRC 670 monitors the value of MBUS count contained in latch 746 and knows the end of the current MBUS request is indicated when an ack is received with an MBUS count of zero.

RFR 642 also provides muxes 756 and 757 that select the count and address provided by MRC 670 for MBUS read cycles into latches 746 and 747 respectively. While an MBUS read cycle is in progress, Read Logic 732 holds off pulling write cycle information out of RF 648.

The invention has been described with reference to a specific exemplary embodiment thereof. Various modification and changes may be made thereunto without departing from the broad spirit and scope of the invention. The specification and drawings are, accordingly, to be regarded in an illustrative rather than a restrictive sense; the invention is limited only by the provided claims.

What is claimed is:

1. A method for processing a stream of data and automatically selecting a portion or all of said stream of data for block writing to a memory, said memory capable of storing data responsive to a block write command and a normal write command, said method comprising the steps of:

transferring data stored in a first data register to a second data register, said first and said second data register having a predetermined width;

loading said first data register with a portion of said stream of data which is contiguous to said data stored in said first data register prior to said transferring step;

comparing data stored in said first and said second data registers;

incrementing a data count in a data counter when said data stored in said first and said second data registers are the same; and generating a block write signal when said data count exceeds a first predetermined value.

2. The method of claim 1 further comprising the step of allocating a data row in a data FIFO having a plurality of rows, each data row containing a field for storing data in said second data register and a field for storing said data count.

3. The method of claim 2 further comprising the step of allocating a new data row to said data FIFO when said block write signal is generated subsequent to generating a normal write signal.

4. The method of claim 3 further comprising the steps of:
   storing a start address in a start address register; and
   storing a control count indicating the number of consecutive addresses needed to be generated in conjunction with writing of data into said memory, said control count being updated when said new data row is allocated.

5. The method of claim 4 further comprising the step of allocating a control row in a control FIFO having a plurality of rows, each control row containing a field for storing said start address and a field for storing said control count.

6. The method of claim 5 wherein said control row is allocated when the sum of said data count and said control count exceeds a predetermined value.

7. The method of claim 5 wherein said control row comprises a field for storing a state indicating one of said block write and said normal write operations.

8. The method of claim 1 wherein said memory comprises a color register containing a value used for block write, said method further comprising the steps of:

storing a value in a last color register which is the same as said value stored in said color register;

comparing contents of said last color register and said second data register; and generating a block write signal when said content of said last color register is the same as the content of said second data register and when said data count exceeds a second predetermined value.

9. The method of claim 1 wherein said memory comprises a color register containing a value used for block write, said method further comprising the steps of:

storing a value in a last color register which is the same as said value stored in said color register;

comparing contents of said last color register and said second data register; and generating a color write signal in addition to said block write signal when said content of said last color register is the not same as the content of said second data register and when said data count exceeds a second predetermined value.

10. A method for processing a stream of data and automatically selecting a portion or all of said stream of data for block writing to a VRAM, said VRAM capable of performing a block write, a normal write, and a color write operation, said VRAM comprising a color register containing a value used for block write, said method comprising the steps of:

transferring data stored in a first data register to a second data register, said first and said second data register having a predetermined width;

loading said first data register with a portion of said stream of data which is contiguous to said data stored in said first data register prior to said transferring step;

comparing data stored in said first and said second data registers;

incrementing a data count in a data counter when said data stored in said first and said second data registers are the same; and allocating a data row in a data FIFO having a plurality of rows, each data row coming a field for storing data in said second data register and a field for storing said data count;

storing a start address in a start address register;

storing a control count indicating the number of consecutive addresses needs to be generated in conjunction with writing of data into said VRAM, said control count being updated when said data row is allocated;

allocating a control row in a control FIFO having a plurality of rows, each control row containing a field for storing said start address and a field for storing said control count;

storing a value in a last color register which is the same as said value stored in said color register;

comparing contents of said last color register and said second data register; and generating a block write signal when said content of said last color register is the same as the content of said second data register and when said data count exceeds a first predetermined value; and generating a color write signal in addition to said block write signal when said content of said last color register is the not same as the content of said second data register and when said data count exceeds a second predetermined value.

11. The method of claim 10 further comprising the step of allocating a new data row when data stored in said first and said second data registers are not the same.

12. The method of claim 10 further comprising the step of allocating a new data row wherein said field for storing data contains data to be stored in said color register.

13. The method of claim 10 further comprising the step of allocating a new data row when said block write signal is generated subsequent to a normal write signal.

14. The method of claim 10 further comprising the steps of:

forming a sum of said data count and said control count; and allocating a new control row when said sum exceeds a predetermined value.

15. The method of claim 10 further comprising the step of allocating a new control row when said block write signal is generated subsequent to a normal write signal.

16. A system for processing a stream of data and automatically selecting a portion or all of said stream of data for block writing to a memory, said memory capable of performing a block write and a normal write operation, said system comprising:

a first data register having a predetermined length, said first data register including a circuit, in response to a clock signal, for loading consecutive bits of said predetermined length from said stream of data into said first data register and for outputting data stored therein prior to said loading;

a second data register having said predetermined length, said second data register being connected to said first data register for receiving data output from said first data register;

a first comparison circuit for generating a count increment signal when contents of said first and said second data registers are the same;

a data counter for storing a data count, said data count being incremented in response to said count increment signal; and a selection circuit for generating a block write signal when said data count exceeds a first predetermined value.

17. The system of claim 16 wherein said memory includes a color register containing a value used for block write, said system further comprising:

a last color register for storing a value which is the same as said value in said color register;

a second comparison circuit for comparing contents of said last color register and said second data register; and wherein said selection circuit generates a color write signal for writing to said color register in addition to generating said block write signal when the content of said last color register is not the same as the content of said second data register and when said data count exceeds a second predetermined value.

18. The system of claim 16 wherein said memory contains a color register containing a value used for block write, said system further comprising:

a last color register for storing a value in said color register;

a second comparison circuit for comparing contents of said last color register and said second data register; and wherein said selection circuit generates a block write signal when said content of said last color register is the same as the content of said second data register and when said data count exceeds a second predetermined value.

19. The system of claim 16 further comprising a data FIFO having a plurality of data rows, each data row containing a field for storing data in said second data register and a field for storing said data count.

20. The system of claim 19 further comprising means for allocating a new data row to said data FIFO when said selection circuit generates said block write signal subsequent to generating a normal write signal.

21. The system of a new data rather comprising means for allocating a new data row to said data FIFO when said selection circuit generates said block write signal subsequent to generating a color write signal.

22. The system of claim 19 further comprising:

a start address register for storing a start address;

a control counter for storing a control count indicating the number of consecutive addresses needed to be generated in conjunction with writing of data into said memory, said control counter being updated when a new data row is allocated.

23. The system of claim 22 further comprising a control FIFO having a plurality of control rows, each control row containing a field for storing said start address and a field for storing said control count.

24. The control row of claim 23 further comprising a field for storing a state indicating one of said block write and said normal write operations.

25. The system of claim 16 further comprising:

a data FIFO having a plurality of data rows, each data row containing a field for storing data in said second data register and a field for storing said data count a start address register for storing a start address;

a control counter for storing a control count indicating the number of consecutive addresses needed to be generated in conjunction with writing of data into said memory, said control counter being updated when a new data row is allocated;

a control FIFO having a plurality of control rows, each control row containing a field for storing said start address and a field for storing said control count.

a driver for retrieving said data row from said data FIFO and said control row from said control FIFO and for writing said data to said memory in accordance with said data count, said control count, and said block write signal.

26. A system for processing a stream of data and automatically selecting a portion or all of said stream of data for block writing to a VRAM, said VRAM capable of performing a block write, a normal write, and a color write operation, said VRAM containing a color register having a value used for said block write operation, said system comprising:

a first data register having a predetermined length, said first data register including a circuit, in response to a clock signal, for loading consecutive bits of said predetermined length from said stream of data into said first data register and for outputting data stored therein prior to said loading;

a second data register having said predetermined length, said second data register being connected to said first data register for receiving data output from said first data register;

a first comparison circuit for generating a count increment signal when contents of said first and said second data registers are the same;

a data counter for storing a data count, said data count being incremented in response to said count increment signal;

a last color register for storing a value which is the same as said value in said color register;

a second comparison circuit for comparing contents of said last color register and said second data register; and a selection circuit generating a color write signal and a block write signal when the content of said last color register is not the same as the content of said second data register and when said data count exceeds said first predetermined value, said selection circuit generating said block write signal when said content of said last color register is the same as the content of said second data register and when said count exceeds a second predetermined value.

27. The system of claim 26 further comprising:

a data FIFO having a plurality of data rows, each data row containing a field for storing data in said second data register and a field for storing said data count;

means for allocating a new data row to said data FIFO when said selection circuit generates said block write signal subsequent to generating a color write signal;

a start address register for storing a start address;

a control counter for storing a control count indicating the number of consecutive addresses needs to be generated in conjunction with writing of data into said VRAM, said control counter being updated when a new data row is allocated;

a control FIFO having a plurality of control rows, each control row containing a field for storing said start address, a field for storing said control count, and a field for storing a state indicating one of said block write, normal write, and color write operations; and a driver for retrieving said data row from said data FIFO and said control row from said control FIFO and for writing said data to said VRAM in accordance with said data count, said control count, and said block write signal.

28. An automatic block write circuit for a multimedia system in a multimedia system with a shared bus for storing a stream of video, graphics and audio in a display memory, the display memory capable of storing the stream of data in a first number of memory locations in response to a first command, and capable of storing the stream of data in a second number of memory locations in response to a second command, the automatic block write circuit comprising:

a first data register having a predetermined length, said first data register including a circuit, in response to a clock signal, for loading consecutive bits of said predetermined length from said stream of data into said first data register and for outputting data stored therein prior to said loading;

a second data register having said predetermined length, said second data register being connected to said first data register for receiving data output from said first data register;

a first comparison circuit for generating a count increment signal when contents of said first and said second data registers are the same;

a data counter for storing a data count, said data count being incremented in response to said count increment signal; and a selection circuit for generating a signal for storing in the second number of memory locations when said data count exceeds a first predetermined value;

whereby traffic on the shared bus is reduced.

* * * * *